United States Patent
Fukari et al.

(10) Patent No.: US 11,225,316 B2
(45) Date of Patent: Jan. 18, 2022

(54) METHOD OF IMPROVING A BLADE SO AS TO INCREASE ITS NEGATIVE STALL ANGLE OF ATTACK

(71) Applicant: AIRBUS HELICOPTERS, Marignane (FR)

(72) Inventors: Raphael Fukari, Le Rove (FR); Paul Eglin, Roquefort la Bedoule (FR)

(73) Assignee: AIRBUS HELICOPTERS, Marignane (FR)

( * ) Notice: Subject to any disclaimer, the term of this patent is extended or adjusted under 35 U.S.C. 154(b) by 214 days.

(21) Appl. No.: 16/274,302

(22) Filed: Feb. 13, 2019

(65) Prior Publication Data
US 2020/0023940 A1    Jan. 23, 2020

(30) Foreign Application Priority Data
Feb. 15, 2018 (FR) ....................................... 1870167

(51) Int. Cl.
*B64C 11/18* (2006.01)
(52) U.S. Cl.
CPC ..................................... *B64C 11/18* (2013.01)
(58) Field of Classification Search
CPC ......... B64C 11/18; B64C 11/16; B64C 27/46; B64C 27/467
See application file for complete search history.

(56) References Cited

U.S. PATENT DOCUMENTS

| | | | | |
|---|---|---|---|---|
| 2,523,186 A | * | 9/1950 | Bennett | B64C 27/82 416/123 |
| 4,519,746 A | * | 5/1985 | Wainauski | B64C 11/18 416/223 R |
| 4,652,213 A | * | 3/1987 | Thibert | B64C 11/18 244/35 R |

(Continued)

FOREIGN PATENT DOCUMENTS

| | | |
|---|---|---|
| EP | 0103478 A1 | 3/1984 |
| EP | 0911257 A2 | 4/1999 |

(Continued)

OTHER PUBLICATIONS

Russian Search Report dated Sep. 24, 2019, Application No. 2019102615, Applicant Airbus Helicopters, FR, 2 Pages.

(Continued)

*Primary Examiner* — Igor Kershteyn
*Assistant Examiner* — Joshua R Beebe
(74) *Attorney, Agent, or Firm* — Brooks Kushman P.C.

(57) ABSTRACT

A method of improving a blade and also an improved blade and a advancement propeller including the improved blade. The radius of the initial leading edge circle of each airfoil of the blade is increased, and its leading edge is moved away from a pressure side half-airfoil towards a suction side half-airfoil, thereby modifying the airfoil of each cross-section of the blade and modifying the camber of each airfoil. Consequently, the absolute value of the negative stall angle of attack of the blade is increased, thus making it possible to increase the aerodynamic performance of the (Continued)

blade under a negative angle of attack compared with a blade that is not modified, and without significantly degrading its aerodynamic performance under a positive angle of attack.

20 Claims, 7 Drawing Sheets

(56) References Cited

U.S. PATENT DOCUMENTS

| | | | | |
|---|---|---|---|---|
| 4,773,825 | A | * | 9/1988 | Rodde ................ B64C 11/18 416/223 R |
| 4,911,612 | A | | 3/1990 | Rodde et al. |
| 4,925,131 | A | * | 5/1990 | Eickmann ............ B64C 27/12 244/7 C |
| 5,344,102 | A | * | 9/1994 | Nakadate ............ B64C 27/467 244/34 R |
| 6,164,918 | A | | 12/2000 | Aoki et al. |
| 6,315,522 | B1 | | 11/2001 | Yamakawa et al. |
| 6,361,279 | B1 | | 3/2002 | Rodde et al. |
| 6,705,838 | B1 | * | 3/2004 | Bak .................... F03D 1/0641 416/243 |
| 7,600,976 | B2 | | 10/2009 | Bagai et al. |
| 7,748,958 | B2 | * | 7/2010 | McVeigh ............ F03D 1/0675 416/1 |
| 7,854,593 | B2 | | 12/2010 | Owen |
| 8,016,566 | B2 | | 9/2011 | Agnihotri et al. |
| 8,113,460 | B2 | | 2/2012 | Roesch |
| 8,113,462 | B2 | | 2/2012 | Shepshelovich et al. |
| 8,186,616 | B2 | | 5/2012 | Shepshelovich et al. |
| 2007/0187549 | A1 | * | 8/2007 | Owen .................. B64C 3/14 244/17.23 |
| 2008/0145219 | A1 | * | 6/2008 | McVeigh ............ F03D 1/0675 416/23 |
| 2009/0257884 | A1 | | 10/2009 | Clark |
| 2013/0170984 | A1 | | 7/2013 | Maddaus |

FOREIGN PATENT DOCUMENTS

| | | |
|---|---|---|
| EP | 2146895 B1 | 4/2011 |
| EP | 2 410 186 A1 | 1/2012 |
| FR | 2626841 A1 | 8/1989 |
| FR | 2765187 A1 | 12/1998 |
| JP | 2002166891 | 6/2002 |
| RU | 2559181 C1 | 8/2015 |

OTHER PUBLICATIONS

Russian Office Action dated Sep. 25, 2019, Application No. 2019102615, 5 Pages.
Russian Search Report dated Sep. 13, 2019, Application No. 2019102614, Applicant Airbus Helicopters, FR, 2 Pages.
Russian Decision to Grant dated Sep. 20, 2019, Application No. 2019102614, 15 Pages.
French Search Report for FR 1800140, Completed by the French Patent Office, dated Sep. 10, 2018, 10 Pages.
Russian Search Report Application No. 2019102615 dated Sep. 24, 2019, English Translation.
Russian Office Action Application No. 2019102615 dated Sep. 25, 2019, English Machine Translation.
Russian Search Report Application No. 2019102614 dated Sep. 13, 2019, English Translation.
Russian Decision to Grant Application No. 2019102614 dated Sep. 20, 2019, Partial English Translation.
EP 2146895 B1, U.S. Pat. No. 8,113,460 B2.
RU 2559181 C1, Abstract & Machine Translation.
French Search Report for FR 1870167, Completed by the French Patent Office, dated Aug. 8, 2018, All together 7 Pages.
U.S. Notice of Allowance dated Jun. 23, 2021, U.S. Appl. No. 16/273,576, 26 Pages.

* cited by examiner

METHOD OF IMPROVING A BLADE SO AS TO INCREASE ITS NEGATIVE STALL ANGLE OF ATTACK

CROSS-REFERENCE TO RELATED APPLICATIONS

This application claims priority to French patent application No. FR 1870167 filed on Feb. 15, 2018, the disclosure of which is incorporated in its entirety by reference herein. This application is related to U.S. application Ser. No. 16/273,576 entitled "A METHOD OF DETERMINING AN INITIAL LEADING EDGE CIRCLE OF AIRFOILS OF A BLADE AND OF IMPROVING THE BLADE IN ORDER TO INCREASE ITS NEGATIVE STALL ANGLE OF ATTACK" filed on Feb. 12, 2019.

BACKGROUND OF THE INVENTION

(1) Field of the Invention

The present invention relates to the field of airfoils for blades and more particularly for blades that are to form a advancement propeller of an aircraft.

The present invention relates to a method of improving a blade in order to increase the absolute value of its negative stall angle of attack, and also to such an improved blade and to a rotor having such improved blades. The improved blade is for fitting to a rotor of an aircraft that is to deliver an aerodynamic force in two opposite directions, i.e. either a force towards the front of the aircraft or else a force towards the rear of the aircraft. This improved blade is intended in particular for a advancement propeller of an aircraft or indeed for an anti-torque tail rotor of a rotary wing aircraft.

(2) Description of Related Art

Conventionally, a blade extends in a longitudinal direction spanwise from a first end to a second end. The term "longitudinal" should be understood as being along the span of the blade. Furthermore, the blade extends transversely from a leading edge to a trailing edge, along the chords of the blade.

The blade includes in particular an outer covering provided with a first skin on its suction side and a second skin on its pressure side, and also successive cross-sections. Each cross-section is defined by an airfoil made up of two half-airfoils, namely a suction side half-airfoil and a pressure side half-airfoil.

Existing airfoils that are used frequently for the blades of aircraft rotors are defined by way of example in the NACA families or else in the OA families, where for example the OA families are described in Documents FR 2 626 841 and FR 2 765 187.

A blade is for fastening to a rotary hub of a rotor at its first end via a blade root, with its second end being referred to as its "free" end. The rotary hub of the rotor drives each blade in rotation. It can be understood that relative to the rotor a blade extends radially from the first end to the second end. A rotor has at least two blades.

Under the effect of an air flow generated by the rotor rotating, each blade of a rotor delivers an aerodynamic force that is generally referred to as "thrust". This aerodynamic force is variable, depending in particular on the angle of attack of the blade, i.e. the angle between the air flow and a straight line from the leading edge to the trailing edge of the airfoil corresponding to the chords of the blade. For a rotor, this angle of attack is generally modified by acting on an axis for varying the pitch of the blade. This pitch axis extends substantially longitudinally along the span of the blade.

It is observed that starting from a threshold angle of attack of the blade, referred to as the "stall" angle of attack, air streamlines become separated from the blade, particularly at its leading edge or at its trailing edge. This separation can lead to the blade stalling aerodynamically, which corresponds to a sudden drop in its thrust. Furthermore, the separation of the air streamlines generates turbulence that gives rise to an increase in the drag coefficient of the blade and also to vibration.

A rotor may be a main rotor of a rotary wing aircraft serving to provide the aircraft with lift, and possibly also propulsion. A rotor may also be an anti-torque tail rotor of a rotary wing aircraft. A rotor may equally be a advancement propeller for a fixed wing aircraft or indeed for a rotary wing aircraft, each blade delivering an aerodynamic force enabling the aircraft to advance. An aircraft may for example have one, or two, or indeed four advancement propellers.

During rotation of a rotor, each blade of the rotor generally delivers an aerodynamic force that is mostly or indeed solely in a single direction, e.g. with a main rotor for the purpose of delivering thrust that counters the weight of the rotary wing aircraft. For a advancement propeller, this aerodynamic force enables the aircraft to advance and to reach high speeds of advance.

Nevertheless, in certain particular situations, this aerodynamic force can be reversed, e.g. for a advancement propeller in order to slow down the aircraft, essentially while landing. This particular operation is nevertheless transient or even marginal.

Consequently, each blade is defined to deliver an aerodynamic force in optimum manner in one direction only, with each blade then operating with a positive angle of attack. For this purpose, the camber of the airfoils of the blade is generally increased.

Camber is a characteristic of an airfoil that is equal to the distance between firstly the chord of the airfoil and secondly a half-thickness line or "camber line" of the airfoil, i.e. the line that is at equal distances from the suction side and pressure side half-airfoils along each normal to the camber line. The distance between the chord and the camber line is taken perpendicularly to the chord, and consequently a positive increase of camber corresponds to a positive increase of said distance. In particular, the camber is zero when the airfoil is symmetrical. In contrast, an airfoil with non-zero camber is an airfoil that is asymmetrical.

A positive increase in the camber of the airfoils of a blade has the effect of increasing the positive stall angle of attack of that blade. Specifically, the positive angle of attack of the blade can be increased as it rotates, consequently increasing the aerodynamic force generated by the blade and increasing its aerodynamic performance.

It is then observed that the mechanical power needed for driving rotation of a rotor having such blades with cambered airfoils in order to deliver a given aerodynamic force at a positive angle of attack is smaller than for blades having airfoils that are not cambered, in particular on approaching the maximum aerodynamic force that the blade can deliver.

By way of example, such blades are described in Document FR 2 765 187. According to that document, the position of the maximum camber of an airfoil along its chord can also be adjusted according to the relative thickness of the airfoil.

In contrast, increasing the camber of airfoils has the opposite effect of reducing in absolute value and thus of increasing in algebraic value the negative stall angle of attack of the blade. Nevertheless, this increase in the negative stall angle of attack is not problematic since the blade operates essentially or indeed solely with a positive angle of attack.

Several documents are also known that describe blades formed by airfoils serving to improve the aerodynamic performance of those blades.

For example, Document US 2007/0187549 describes an improved aerodynamic profile for forming a helicopter rotor blade, preferably for a helicopter having two contrarotating rotors and a propulsion propeller enabling the helicopter to fly at high speeds of advance. Such an improved airfoil has small thickness and small camber in a leading edge region of the profile. That improved airfoil is adapted to air flows at high speeds by delaying the formation of a shock wave at high speeds of advance.

Furthermore, Documents EP 0 103 478 and JP 2002/166891 describe airfoils with a large leading edge radius for the purposes of delaying the formation of a shock wave when the speed of advance of the aircraft increases and of obtaining high values for the lift/drag ratio over a wide range of speeds of advance, e.g. according to Document EP 0 103 478.

Document US 2009/0257884 also describes an airfoil with a leading edge radius that is large, that airfoil being for forming a wind turbine blade.

Furthermore, Document US 2008/0145219 describes a helicopter rotor blade having one or more vortex generators. Each vortex generator enables the blade to be more tolerant in terms of angles of attack and Mach number prior to stalling. Furthermore, an airfoil of such a blade may have a leading edge radius that is adapted, or even adjustable, for optimizing its performance.

Finally, Document US 2013/0170984 describes a steam turbine in which the blades are twisted over their entire length in order to limit the appearance of vibration in the turbine and having leading edges that may be radiused in order to optimize the performance of the blades of the turbine.

In addition, a rotary wing aircraft, also known as a "rotorcraft", can fly both at high speeds of advance in cruising flight and also at very low speeds of advance, and can perform hovering flight. Such a rotorcraft conventionally comprises a fuselage, at least one main rotor, an anti-torque device, and a power plant.

An anti-torque device performs an anti-torque function to oppose a rotor torque in yaw as generated mainly by the rotation of the main rotor of the aircraft. By way of example, an anti-torque device may be constituted by a tail rotor located at the rear end on a tail boom of the aircraft. That anti-torque tail rotor acts via the aerodynamic force generated by its blades to generate a moment that opposes the rotor torque.

Also known is a hybrid helicopter, namely a rotorcraft having at least one main rotor, a fuselage, a power plant, auxiliary propulsion, and generally a lift surface, e.g. made up of two wings situated on either side of the fuselage. The auxiliary propulsion may be formed by one or more advancement propellers, e.g. two advancement propellers arranged on opposite sides of the fuselage.

The auxiliary propulsion may constitute the anti-torque device of a hybrid helicopter, in particular when the auxiliary propulsion comprises two advancement propellers arranged on opposite sides of the fuselage. Under such circumstances, the advancement propellers deliver different aerodynamic forces giving rise to the appearance of a moment that opposes the rotor torque. In particular during hovering flight, a first advancement propeller arranged on one side of the fuselage delivers an aerodynamic force towards the front of the rotorcraft, while a second advancement propeller arranged on the other side of the fuselage delivers an aerodynamic force towards the rear of the rotorcraft.

As a result, the second advancement propeller needs to deliver an aerodynamic force towards the front of the aircraft during forward flight of the aircraft and an aerodynamic force towards the rear of the aircraft during hovering flight, whereas the first advancement propeller always delivers an aerodynamic force towards the front of the rotorcraft whatever the stage of flight of the rotorcraft. In order to reverse the aerodynamic force of the second advancement propeller, each blade of the second advancement propeller needs to pass from a positive angle of attack for forward flight to a negative angle of attack for hovering flight, whereas each blade of the first advancement propeller always has a positive angle of attack, regardless of the stage of flight of the rotorcraft.

As mentioned above, each blade of a advancement propeller is defined to deliver an aerodynamic force in optimum manner in one direction only, each blade then having a positive angle of attack. As a result, each blade of the first and second advancement propellers is preferably defined to deliver a large aerodynamic force directed towards the front of the hybrid helicopter, e.g. having airfoils that are asymmetrical, giving rise to good aerodynamic performance under positive angles of attack.

Consequently, in hovering flight, each blade of the second advancement propeller delivers an aerodynamic force directed towards the rear of the hybrid helicopter while using airfoils that are not optimized for that purpose. In particular, each blade of the second advancement propeller may operate at a negative angle of attack close to a negative stall angle of attack of the blade. Conventional asymmetrical airfoils under such circumstances present aerodynamic performance that is not optimized, since the camber of their airfoils is unsuited to such negative angles of attack.

Under such circumstances, the second advancement propeller needs greater mechanical power to drive it in rotation during hovering flight, and in particular it requires greater power than does the first advancement propeller while generating a substantially identical aerodynamic force, but directed solely towards the front of the aircraft.

One solution for increasing the aerodynamic performance of the blade under negative angles of attack is to reduce the camber of the airfoils of the blade, or indeed to reverse it. Nevertheless and as mentioned above, that solution is contradictory to the designed performance looked-for in forward flight.

The use of blades with symmetrical airfoils, e.g. derived from the NACA family, would make it possible to have substantially identical aerodynamic behavior for the blade when subjected to a flow of air at a positive angle of attack or at a negative angle of attack, possibly by adapting the twist of the blade. Nevertheless, the use of blades with such symmetrical airfoils does not make it possible to obtain large aerodynamic forces both towards the front and towards the rear of the aircraft regardless of the angle of attack of the blade, and would therefore require higher mechanical powers for driving those blades in rotation in order to deliver the necessary aerodynamic forces.

BRIEF SUMMARY OF THE INVENTION

Under such conditions, the present invention proposes a method of improving a blade that makes it possible to overcome the above-mentioned limitations and to modify the airfoils of an existing blade in order to obtain aerodynamic performance that is greater than the aerodynamic performance of that existing blade. Consequently, the absolute value of the negative stall angle of attack of the modified blade is increased, thereby enabling the modified blade to deliver large reverse aerodynamic force at a negative angle of attack without degrading the aerodynamic force it delivers at a positive angle of attack.

As a result, the modified blade serves to obtain high aerodynamic performance in two opposite directions, depending on requirements, while minimizing the power needed for driving such modified blades in rotation, including at negative angles of attack.

The present invention also provides a blade improved by this method, a rotor including at least two blades improved in this way, and a rotary wing aircraft having two such advancement propellers including one propeller formed by this rotor.

A blade extends in a longitudinal span direction from a first end to a second end and in a transverse direction from a leading edge to a trailing edge. The blade has successive cross-sections, each cross-section being defined by an airfoil, each airfoil being defined in particular by two half-airfoils including a suction side half-airfoil and a pressure side half-airfoil, each of the two half-airfoils comprising respectively a leading edge segment, an intermediate segment, and a terminal segment, the leading edge segment of each half-airfoil being formed by a portion of an initial leading edge circle. For each half-airfoil the leading edge segment begins at the leading edge, the terminal segment terminates at the trailing edge, and the intermediate segment is situated between the leading edge segment and the terminal segment.

The blade is connected to a rotary hub of a rotor at the first end of the blade via a blade root. The function of the blade root is essentially structural and its contribution to the aerodynamic performance of the rotor is secondary. Thus, in the context of the invention, it is considered that a blade is thus constituted solely by an airfoil portion that provides essentially all of the aerodynamic force of the rotor.

According to the invention, the method of improving a blade comprises a first step of modifying at least one half-airfoil of at least one airfoil, this first step of modification having the following substeps:
  increasing the radius of the initial leading edge circle for this at least one half-airfoil in order to form a new leading edge circle for this at least one half-airfoil, including a portion that constitutes a new leading edge segment of this at least one half-airfoil, the new leading edge circle of this at least one half-airfoil being tangential to the initial leading edge circle of this at least one half-airfoil at the leading edge; and
  defining a new intermediate segment for this at least one half-airfoil replacing the intermediate segment of this at least one half-airfoil and connecting the new leading edge circle of this at least one half-airfoil to the terminal segment of this at least one half-airfoil in order to increase a negative stall angle of attack of the blade.

During this first step, it is possible to modify only one of the two half-airfoils of each airfoil, namely the suction side half-airfoil or else the pressure side half-airfoil. It is also possible during this first step to modify both of the half-airfoils of each airfoil.

Specifically, the suction side and pressure side half-airfoils are generally characterized by the coordinates of points enabling them to be constructed. Furthermore, the leading edge segments of these two half-airfoils may be circular in shape, each being formed by a portion of the respective initial leading edge circle of radius and coordinates that are known from the definitions of the suction side and pressure side half-airfoils, as described in Document EP 0 911 257. The portions of these initial leading edge circles of the two half-airfoils then coincide respectively with the leading edge segments of these two half-airfoils of the airfoil, the respective radii of the initial leading edge circles being equal to the radii of the leading edge segments of the half-airfoils. Under such circumstances, the initial leading edge circles of the two half-airfoils generally have the same center and the same radius.

When the leading edge segments of the suction side and pressure side half-airfoils are not portions of circles, at least one of these initial leading edge circles of the two half-airfoils may be determined a posteriori, during a preliminary step of the method of the invention in order to characterize the leading edge segments. This initial leading edge circle of the suction side and/or pressure side half-airfoils is thus estimated by geometrical constructions from the respective leading edge segments of these suction side and pressure side half-airfoils. The initial leading edge circles of the suction side and pressure side half-airfoils as estimated in this way are generally different, in particular when the airfoils have non-zero camber. Knowledge of the initial leading edge circle of a half-airfoil and of its radius serves advantageously to characterize this half-airfoil easily, e.g. in order to identify firstly airfoils that can be said to be versatile, i.e. that have a wide operating range but with moderate aerodynamic performance, associated with large radii for the leading edge circle, and secondly airfoils having small radii for the leading edge circle that are associated with narrow operating ranges and with high aerodynamic performance.

This preliminary determination step comprises the following substeps:
  defining a straight line segment connecting the leading edge to the trailing edge of the airfoil;
  creating a construction circle passing through the leading edge of the airfoil, the center of the construction circle being situated on the straight line segment, the construction circle being inscribed in the half-airfoil;
  increasing the radius of the construction circle, the center of the construction circle being moved along the straight line segment and the construction circle continuing to pass through the leading edge, until the construction circle intersects the half-airfoil, i.e. until the construction circle is no longer inscribed inside the half-airfoil; and
  determining the initial leading edge circle of the half-airfoil, the initial leading edge circle being the largest construction circle inscribed inside the half-airfoil, the center of the initial leading edge circle being the center of this largest construction circle inscribed inside the half-airfoil and being situated on the straight line segment, the radius of the initial leading edge circle being the radius of this largest construction circle inscribed inside the half-airfoil.

This preliminary step can thus be used to estimate the initial leading edge circle of one only of the two half-airfoils defining each airfoil of a blade, namely the suction side half-airfoil or the pressure side half-airfoil, and to estimate the value of the radius of the initial leading edge circle.

This preliminary step can also be used to estimate two initial leading edge circles for the two half-airfoils defining each airfoil of a blade and to estimate the values of their radii.

Knowledge of the initial leading edge circle of a half-airfoil and of its radius also serves to envisage modifying the half-airfoil by applying the first step of the method of the invention for improving a blade, by beginning by replacing the leading edge segment of that half-airfoil with a portion of the initial leading edge circle as estimated in this way and that is attached to this half-airfoil.

Specifically, in the context of the invention, replacing the leading edge segment of a half-airfoil by an initial leading edge circle subsequently facilitates modifying this half-airfoil, in particular by modifying the radius of this initial leading edge circle and thereby forming the new leading edge circle. The new leading edge segment is then formed by a portion of the new leading edge circle, this portion preferably being constituted at most by a first fourth of this new leading edge circle, this first fourth starting at the leading edge and being situated on the same side as this half-airfoil relative to the leading edge. The position of the leading edge proper of each airfoil remains unchanged and the new leading edge segment of this half-airfoil passes through the leading edge.

The intermediate segment of the half-airfoil is replaced by a new intermediate segment connecting the new leading edge segment of the half-airfoil, i.e. a portion of the new leading edge circle, to the terminal segment of the half-airfoil, this terminal segment remaining unchanged. The new intermediate segment is tangential to the new leading edge segment and to the terminal segment of the half-airfoil.

This new intermediate segment has a tangent that varies continuously and it preferably does not include any point of inflection. This new intermediate segment begins on the new leading edge circle, i.e. on the new leading edge segment, at a starting point situated at a first distance from the leading edge, which first distance is a minimum transverse distance, i.e. parallel to the transverse direction, and lies for example in the range 0.5% to 5% of a chord $c$ of the airfoil. It should be recalled that the chord $c$ is equal to the distance between the leading edge and the trailing edge of the airfoil. Furthermore, the position of the starting point of the new intermediate segment on the new leading edge circle may be constrained by the fact that the derivative of the polynomial defining this new intermediate segment is positive so as to avoid the presence of a point of inflection on this new intermediate segment. By way of example, this new intermediate segment may be defined by a polynomial of order 3.

In addition, the new intermediate segment connects with the terminal segment at a second distance from the leading edge, which second distance is a transverse distance and is equal by way of example to at most 25% of the chord $c$ of the airfoil.

Furthermore, when both the suction side and the pressure side half-airfoils are modified, the radii of the new leading edge circles of the suction side and pressure side half-airfoils may differ for some of the airfoils of the modified blade, and possibly for all of the airfoils of the modified blade. Preferably, the radius of the new leading edge circle of the pressure side half-airfoil is less than or equal to the radius of the new leading edge circle of the suction side half-airfoil for each airfoil of the blade.

Specifically, the radius of the leading edge of a pressure side half-airfoil is generally less than or equal to the radius of the leading edge of the suction side half-airfoil for a cambered airfoil, thus making it possible to have performance that is good in terms of positive thrust.

By way of example, the radius of the new leading edge circle of a suction side half-airfoil lies in the range 110% to 160% of the radius of the initial leading edge circle of this suction side half-airfoil, and the radius of the new leading edge circle of a pressure side half-airfoil lies in the range 100% to 280% of the radius of the initial leading edge circle of this pressure side half-airfoil. Preferably, for each airfoil of the blade, the radius of the new leading edge circle of a suction side half-airfoil lies in the range 110% to 140% of the radius of the initial leading edge circle of the suction side half-airfoil, and the radius of the new leading edge circle of a pressure side half-airfoil lies in the range 115% to 220% of the radius of the initial leading edge circle of the pressure side half-airfoil. The values of these percentages may be influenced by the relative thickness of each airfoil of the blade, namely the ratio of its maximum thickness $e$ divided by its chord $c$.

In addition, a first ratio of the radius of the new leading edge circle of a half-airfoil divided by the radius of the initial leading edge circle of the half-airfoil is preferably not the same for each airfoil of the blade.

In addition, the thickness $e$ of the airfoil is preferably unchanged for each airfoil of the blade, while the chord $c$ may be modified slightly. It should be recalled that the thickness $e$ of an airfoil is equal to the maximum distance between the two half-airfoils defining the airfoil, namely the pressure side and the suction side half-airfoils, taken perpendicularly to the chord line of that airfoil.

Advantageously, the aerodynamic performance of the modified blade, having airfoils that have been modified, are thus improved and better under negative angles of attack than the aerodynamic performance of the blade prior to being modified. Specifically, this increase in the radius of the initial leading edge circle for one or indeed both of the half-airfoils defining each airfoil of the blade serves to modify the flow of air over these half-airfoils of the modified blade, in particular under negative angles of attack, and consequently to increase in absolute value, and thus to decrease in algebraic value, the negative stall angle of attack of the modified blade. The positive stall angle of attack of the modified blade is also decreased as a result of modifying the half-airfoil. Nevertheless, the utilization zone of the blade relates to positive angles of attack that continue to be less than the positive stall angle of attack of the modified blade.

As a result, the aerodynamic performance of the blade under positive angles of attack is substantially unmodified, apart from the movement in the positive stall angle of attack. The modified blade can thus deliver a reverse aerodynamic force under a negative angle of attack without degrading the aerodynamic force it delivers under a positive angle of attack. In particular, the slope of a curve relating the lift coefficient Cz of the blade to its angle of attack is substantially identical for the blade modified by the method of the present invention and for a blade that is not modified.

Consequently, a rotor fitted with such blades modified by the method of the invention for improving a blade can advantageously deliver a reverse aerodynamic force, with the blades of the rotor then all being at a negative angle of attack, and can thus reduce the power needed to drive rotation of the rotor compared with a rotor having blades that have not been modified and that need to deliver the same reverse aerodynamic force. This reduction in the power needed for driving rotation of the rotor is advantageously obtained solely by modifying the leading edge zones of the airfoils of the blade, with the diameter of the rotor and the number of blades that it includes remaining unchanged.

The improved blade is for use in particular in advancement propellers of aircraft and more specifically in advancement propellers of hybrid helicopters, so such a rotor is then a advancement propeller.

A hybrid helicopter having two advancement propellers thus has a first advancement propeller provided with blades that have not been modified and a second advancement propeller provided with blades that have been modified by the method of the invention for improving a blade, this second advancement propeller serving to deliver a reverse aerodynamic force during hovering flight of the hybrid helicopter. The method of the present invention for improving a blade thus advantageously makes it possible to improve the performance of the anti-torque device of the hybrid helicopter in hovering flight, the anti-torque device being constituted by the advancement propellers.

The power developed by the power plant of the hybrid helicopter for driving rotation of the second advancement propeller is thus reduced, and the power saved can then be used by way of example for increasing the payload of the hybrid helicopter. This reduction in the power needed for driving rotation of the second advancement propeller may also have the consequence of optimizing the power plant of the hybrid helicopter, and consequently of reducing the total weight of the aircraft.

Furthermore, by pushing back the stall limit under a negative angle of attack, the margins for maneuvering the hybrid helicopter are also improved, and consequently flight safety is also improved.

This method is for applying to blades in which successive cross-sections are formed by existing airfoils, that may equally well be symmetrical or asymmetrical. By way of example, such existing airfoils may be profiles that are frequently used and that are defined in NACA families or in OA families, and in particular in the OA3 and OA4 families.

The method of the present invention for improving a blade may also include a second step for moving the leading edge of each airfoil of the blade, the second step having the following substeps:

moving the leading edge of each airfoil of the blade through a third distance perpendicularly to the straight line segment, from the pressure side half-airfoil towards the suction side half-airfoil, the initial leading edge segments or indeed, where appropriate, the new leading edge segments of both half-airfoils of the airfoil also being moved; and defining new intermediate segments for both half-airfoils respectively connecting the initial leading edge segment or the new leading edge segment of the two half-airfoils to the terminal segments of both half-airfoils.

Under such circumstances, for each half-airfoil, a new intermediate segment connects the leading edge segment or the new leading edge segment that previously replaced the leading edge segment during the first step of the method, as moved in this way to the terminal segment of the half-airfoil, this terminal segment remaining unchanged.

This movement of the leading edge of each airfoil "towards the suction side half-airfoil" leads to a modification of the camber line of each airfoil of the blade in the vicinity of the leading edge. This movement of the leading edge of each airfoil thus gives rise to a modification to the camber of each airfoil of the blade, but without inverting this camber (the direction of the camber is conserved), the camber thus being reduced. This modification of the position of the leading edge of each airfoil of the modified blade and this modification of the camber line make it possible likewise to modify the flow of air over the two half-airfoils of the modified blade, in particular under negative angles of attack. Consequently, the negative stall angle of attack of the modified blade is increased in absolute value, and is thus decreased in algebraic value, and the positive stall angle of attack of the modified blade is reduced while remaining outside the utilization zone of the blade.

Specifically, the aerodynamic performance of the modified blade is once more advantageously improved, and the blade as modified in this way can deliver a reverse aerodynamic force under a negative angle of attack without degrading an aerodynamic force it delivers under a positive angle of attack.

By way of example, the third distance may lie in the range 0.5% to 2% of the chord $c$ of the airfoil so as to avoid significantly modifying the aerodynamic behavior of the modified blade, and in particular its aerodynamic behavior under positive angles of attack. Preferably, the third distance lies in the range 1% to 1.5% of the length of the chord $c$.

After moving the leading edge of each airfoil, connection conditions between the new intermediate segment and firstly the new leading edge circle and secondly the terminal segment are identical to those mentioned for the first step of the method of the invention for each half-airfoil. In particular, the new intermediate segment of each half-airfoil presents tangents that vary in continuous manner and that still preferably do not include any point of inflection. Likewise, the new intermediate segment begins on the new leading edge circle at a starting point situated at a first distance from the leading edge, which first distance is a minimum transverse distance, e.g. lying in the range 0.5% to 5% of a chord $c$ of the airfoil, and it connects to the terminal segment at a second distance, which second distance is a transverse distance that is equal by way of example to at most 25% of the chord $c$.

The method of the invention for improving a blade may also include a third step of fabricating a blade that seeks to fabricate a blade as defined by the airfoils modified as described above. These airfoils may be modified in accordance with the first step only or in accordance with both the first and the second steps.

The present invention also provides a modified blade, also referred to as an "improved blade" in this specification, as defined by the airfoils modified by the steps of the above-described method of improving a blade. The blade is made using these modified airfoils.

By way of example, there follow the coordinates in a (u, v) reference frame for the points constituting an OA312 airfoil and an OA312 airfoil modified in accordance with the described method. The origin of the (u, v) reference frame is positioned at the leading edge of the unmodified OA312 airfoil and its abscissa axis $u$ is defined along the initial chord of the unmodified OA312 airfoil.

| Initial OA312 | | Modified OA312 | |
| --- | --- | --- | --- |
| u | v | u | v |
| 1 | −0.001786945 | 1 | −0.001786945 |
| 0.99308697 | −0.001988992 | 0.993196671 | −0.001985598 |
| 0.98618332 | −0.002215004 | 0.986394068 | −0.002207676 |
| 0.97928141 | −0.002488529 | 0.979593055 | −0.002474188 |
| 0.97238481 | −0.002873193 | 0.972797017 | −0.002846444 |
| 0.96549693 | −0.003391046 | 0.966009283 | −0.00334798 |
| 0.95861932 | −0.004031037 | 0.959231538 | −0.003969973 |

-continued

| Initial OA312 | | Modified OA312 | |
|---|---|---|---|
| u | v | u | v |
| 0.95175004 | −0.004755215 | 0.952462167 | −0.004677375 |
| 0.94488588 | −0.005526345 | 0.945698087 | −0.00543364 |
| 0.9380239 | −0.006316667 | 0.938936411 | −0.006211139 |
| 0.93116231 | −0.007110455 | 0.932175284 | −0.00699338 |
| 0.92430036 | −0.007901099 | 0.925413868 | −0.007773122 |
| 0.91743785 | −0.008686784 | 0.918651913 | −0.008548178 |
| 0.91057473 | −0.009467167 | 0.911889371 | −0.009318091 |
| 0.90371098 | −0.010242006 | 0.905126235 | −0.010082772 |
| 0.89684642 | −0.011009672 | 0.898362357 | −0.010840856 |
| 0.88998083 | −0.011767963 | 0.891597532 | −0.011590451 |
| 0.88311385 | −0.012513652 | 0.884831428 | −0.012328409 |
| 0.87624547 | −0.013246371 | 0.878063944 | −0.013053601 |
| 0.86937573 | −0.013966138 | 0.871295153 | −0.013766489 |
| 0.86250431 | −0.014669695 | 0.864524839 | −0.01446477 |
| 0.855631 | −0.015354588 | 0.857752694 | −0.015145064 |
| 0.84875609 | −0.016023159 | 0.850978899 | −0.015808721 |
| 0.84187951 | −0.016674371 | 0.844203571 | −0.016456549 |
| 0.83500099 | −0.017304736 | 0.837426402 | −0.017084812 |
| 0.82812076 | −0.017916223 | 0.830647466 | −0.01769373 |
| 0.82123893 | −0.018509382 | 0.823866985 | −0.018285182 |
| 0.81435538 | −0.019082246 | 0.817084869 | −0.018857594 |
| 0.80747017 | −0.0196348 | 0.810301096 | −0.019410013 |
| 0.80058343 | −0.020167853 | 0.80351579 | −0.01994328 |
| 0.79369518 | −0.020681173 | 0.796729019 | −0.020457552 |
| 0.78680546 | −0.021174303 | 0.789940809 | −0.020952474 |
| 0.77991423 | −0.021645881 | 0.783151154 | −0.02142717 |
| 0.77302154 | −0.022095488 | 0.77636003 | −0.02188035 |
| 0.76612762 | −0.022525939 | 0.769567587 | −0.022313335 |
| 0.7592327 | −0.022940139 | 0.762774083 | −0.022729319 |
| 0.75233688 | −0.023338955 | 0.755979673 | −0.023130046 |
| 0.74544014 | −0.023721549 | 0.749184378 | −0.023515873 |
| 0.73854257 | −0.02408907 | 0.742388212 | −0.023885831 |
| 0.73164438 | −0.024444449 | 0.735591337 | −0.024242526 |
| 0.72474553 | −0.024787018 | 0.728793868 | −0.024587352 |
| 0.71784596 | −0.025114649 | 0.721995724 | −0.024919355 |
| 0.71094582 | −0.025430132 | 0.715196908 | −0.025236924 |
| 0.70404533 | −0.025737764 | 0.708397634 | −0.025544526 |
| 0.69714454 | −0.026038752 | 0.701598053 | −0.025845245 |
| 0.69024347 | −0.026333082 | 0.694798192 | −0.026139602 |
| 0.68334214 | −0.026621348 | 0.687998051 | −0.026427388 |
| 0.67644068 | −0.026906334 | 0.681197702 | −0.026710228 |
| 0.66953903 | −0.027186863 | 0.674397224 | −0.026989947 |
| 0.66263715 | −0.027461505 | 0.667596548 | −0.027264813 |
| 0.65573502 | −0.027729962 | 0.660795631 | −0.027533653 |
| 0.64883275 | −0.027994805 | 0.6539945 | −0.027797017 |
| 0.64193034 | −0.028255812 | 0.647193248 | −0.028057231 |
| 0.63502771 | −0.028510995 | 0.640391836 | −0.028313241 |
| 0.62812484 | −0.028759645 | 0.633590203 | −0.028563323 |
| 0.62122173 | −0.029001421 | 0.626788339 | −0.028807008 |
| 0.61431834 | −0.029235398 | 0.619986234 | −0.029043913 |
| 0.60741467 | −0.02946073 | 0.613183863 | −0.029273046 |
| 0.60051077 | −0.02967868 | 0.606381216 | −0.029493794 |
| 0.59360667 | −0.029890434 | 0.599578347 | −0.029707604 |
| 0.58670242 | −0.030097182 | 0.592775298 | −0.0299156 |
| 0.57979794 | −0.030296257 | 0.5859721 | −0.030118688 |
| 0.57289314 | −0.030483864 | 0.57916867 | −0.030313852 |
| 0.56598808 | −0.030661313 | 0.572364927 | −0.03049775 |
| 0.55908286 | −0.030832784 | 0.565560931 | −0.030672048 |
| 0.55217755 | −0.031000383 | 0.558756795 | −0.030840795 |
| 0.54527206 | −0.031160688 | 0.551952565 | −0.031005743 |
| 0.53836638 | −0.031312521 | 0.545148165 | −0.03116348 |
| 0.53146056 | −0.031457535 | 0.538343579 | −0.031313011 |
| 0.52455455 | −0.031593224 | 0.531538852 | −0.031455938 |
| 0.51764835 | −0.03171937 | 0.52473394 | −0.031589825 |
| 0.510742 | −0.031836384 | 0.517928853 | −0.031714422 |
| 0.50383548 | −0.031943495 | 0.511123609 | −0.031830168 |
| 0.49692881 | −0.032039745 | 0.504318209 | −0.031936351 |
| 0.490022 | −0.032126268 | 0.497512653 | −0.032032039 |
| 0.48311511 | −0.032205957 | 0.490706967 | −0.032117987 |
| 0.4762081 | −0.032273796 | 0.483901202 | −0.032197353 |
| 0.46930096 | −0.032327242 | 0.477095319 | −0.032265929 |
| 0.46239376 | −0.032371823 | 0.470289308 | −0.032320316 |
| 0.45548654 | −0.032412711 | 0.463483226 | −0.032365091 |
| 0.44857928 | −0.032447356 | 0.456677121 | −0.032405942 |
| 0.44167197 | −0.032471172 | 0.449870986 | −0.032441642 |
| 0.43476464 | −0.032485408 | 0.443064806 | −0.032467215 |
| 0.4278573 | −0.032490617 | 0.436258596 | −0.032483086 |
| 0.42094995 | −0.032487809 | 0.429452371 | −0.032490197 |
| 0.41404261 | −0.032477885 | 0.422646143 | −0.032489133 |
| 0.40713529 | −0.032459292 | 0.415839919 | −0.032481255 |
| 0.400228 | −0.032432138 | 0.40903371 | −0.032465258 |
| 0.39332074 | −0.032396333 | 0.402227525 | −0.032440931 |
| 0.38641353 | −0.032352989 | 0.395421376 | −0.03240799 |
| 0.37950639 | −0.03229981 | 0.388615266 | −0.032367826 |
| 0.37259931 | −0.032239735 | 0.381809217 | −0.032318475 |
| 0.36569231 | −0.032170758 | 0.375003228 | −0.032261403 |
| 0.35878542 | −0.03209116 | 0.368197303 | −0.03219708 |
| 0.35187862 | −0.032004481 | 0.361391487 | −0.032122196 |
| 0.34497191 | −0.031910779 | 0.354585764 | −0.032039251 |
| 0.33806528 | −0.031811182 | 0.347780125 | −0.031949679 |
| 0.33115874 | −0.031705226 | 0.340974572 | −0.031853825 |
| 0.32425232 | −0.031592553 | 0.334169101 | −0.031752274 |
| 0.31734598 | −0.031474775 | 0.327363733 | −0.031644051 |
| 0.31043975 | −0.0313505 | 0.320558458 | −0.031530134 |
| 0.30353372 | −0.031215712 | 0.313753268 | −0.031411284 |
| 0.29662781 | −0.031074903 | 0.306948237 | −0.031283611 |
| 0.28972193 | −0.030932258 | 0.300143383 | −0.031146822 |
| 0.28281621 | −0.030782557 | 0.293338582 | −0.031007455 |
| 0.27591065 | −0.030625583 | 0.286533862 | −0.030864197 |
| 0.26900525 | −0.030461628 | 0.279729308 | −0.030713192 |
| 0.26210003 | −0.030290046 | 0.272924904 | −0.030555618 |
| 0.25519503 | −0.030110199 | 0.266120671 | −0.030390859 |
| 0.24829025 | −0.029921872 | 0.259316619 | −0.030218702 |
| 0.24138582 | −0.02972115 | 0.252512799 | −0.030037765 |
| 0.23448204 | −0.029499344 | 0.245709168 | −0.02984953 |
| 0.22757795 | −0.029287343 | 0.2389061 | −0.029642347 |
| 0.22067396 | −0.029071792 | 0.232103344 | −0.029424966 |
| 0.2137702 | −0.028849395 | 0.225300281 | −0.029217381 |
| 0.20686666 | −0.02861994 | 0.218497451 | −0.029002322 |
| 0.19996326 | −0.028386759 | 0.211694821 | −0.02878103 |
| 0.19306012 | −0.028145708 | 0.20489239 | −0.028553712 |
| 0.18615717 | −0.0278991 | 0.1980901 | −0.028322196 |
| 0.17925445 | −0.027646376 | 0.191288083 | −0.028082795 |
| 0.17235203 | −0.027385671 | 0.184486235 | −0.027838658 |
| 0.16544986 | −0.027118338 | 0.177684636 | −0.027587677 |
| 0.15854801 | −0.026842676 | 0.170883306 | −0.027329498 |
| 0.15164628 | −0.026564226 | 0.164082254 | −0.02706411 |
| 0.14474506 | −0.026273412 | 0.157281464 | −0.026792042 |
| 0.13784413 | −0.025975833 | 0.150480843 | −0.02651589 |
| 0.13094412 | −0.02565757 | 0.143680696 | −0.026228166 |
| 0.12404474 | −0.025325923 | 0.136880887 | −0.02593271 |
| 0.11714637 | −0.024973975 | 0.130081991 | −0.025616805 |
| 0.11024893 | −0.024604117 | 0.123283702 | −0.025288199 |
| 0.10335269 | −0.024212558 | 0.11648642 | −0.024939313 |
| 0.09645803 | −0.023794076 | 0.109690041 | −0.024573293 |
| 0.08956534 | −0.023344476 | 0.102894859 | −0.024185659 |
| 0.08267502 | −0.022859797 | 0.096101239 | −0.023771588 |
| 0.07578807 | −0.022329426 | 0.089309534 | −0.023327169 |
| 0.06890528 | −0.021747557 | 0.082520166 | −0.022848405 |
| 0.06202161 | −0.021102161 | 0.075734086 | −0.022325075 |
| 0.05515825 | −0.020384111 | 0.06895205 | −0.021751715 |
| 0.04829807 | −0.019578361 | 0.062175509 | −0.021116713 |
| 0.04145067 | −0.018670616 | 0.055405911 | −0.020411465 |
| 0.03462205 | −0.017630536 | 0.048569015 | −0.01959513 |
| 0.02782328 | −0.016411105 | 0.041857093 | −0.018331146 |
| 0.02107598 | −0.014935380 | 0.035361778 | −0.016646922 |
| 0.01443014 | −0.013049858 | 0.02889838 | −0.014519503 |
| 0.00806224 | −0.010384561 | 0.022565134 | −0.011936864 |
| 0.0025131 | −0.006290967 | 0.016517841 | −0.008896071 |
| 0 | 0 | 0.010767086 | −0.005266414 |
| 0.00181962 | 0.006398846 | 0.005564092 | −0.000900209 |
| 0.00544734 | 0.011963855 | 0.001378576 | 0.004660301 |
| 0.0099923 | 0.016842324 | 0.0000531 | 0.011063518 |
| 0.01500132 | 0.021220512 | 0.002359147 | 0.017428969 |
| 0.02034035 | 0.025202719 | 0.006540217 | 0.022760138 |
| 0.02590894 | 0.028851295 | 0.011584271 | 0.027357699 |
| 0.03166044 | 0.032206505 | 0.017055197 | 0.031398858 |
| 0.03755644 | 0.0353001 | 0.022773637 | 0.035020099 |
| 0.04357001 | 0.038158629 | 0.028782261 | 0.038377771 |
| 0.04968097 | 0.040802626 | 0.034714585 | 0.041357472 |

-continued

| Initial OA312 | | Modified OA312 | |
|---|---|---|---|
| u | v | u | v |
| 0.05587318 | 0.043250297 | 0.04104269 | 0.044243616 |
| 0.06213457 | 0.045515176 | 0.04764504 | 0.046986069 |
| 0.06845575 | 0.047607406 | 0.053520572 | 0.049225586 |
| 0.07482821 | 0.049537826 | 0.060005457 | 0.051499484 |
| 0.08124387 | 0.0513195 | 0.066470409 | 0.053574728 |
| 0.08820416 | 0.053085968 | 0.072860138 | 0.055447169 |
| 0.09472631 | 0.054600391 | 0.079566418 | 0.057226152 |
| 0.10127513 | 0.05599533 | 0.086252972 | 0.058809723 |
| 0.10784577 | 0.057282031 | 0.092523495 | 0.06011674 |
| 0.1144356 | 0.058465575 | 0.099464645 | 0.061348393 |
| 0.1210419 | 0.05955505 | 0.106329761 | 0.062316521 |
| 0.12766218 | 0.060556505 | 0.112842766 | 0.062960094 |
| 0.1342944 | 0.061475689 | 0.119695822 | 0.063375175 |
| 0.14093683 | 0.062318761 | 0.126821535 | 0.064347542 |
| 0.14758792 | 0.063090357 | 0.133449162 | 0.064858948 |
| 0.15424625 | 0.063795598 | 0.140359805 | 0.065210542 |
| 0.16091073 | 0.064438634 | 0.147078544 | 0.065470225 |
| 0.1675805 | 0.065023344 | 0.15394452 | 0.065690149 |
| 0.17425476 | 0.065553844 | 0.160832609 | 0.065885435 |
| 0.18093267 | 0.066033711 | 0.167666831 | 0.066068107 |
| 0.18761362 | 0.066465745 | 0.174390994 | 0.066248131 |
| 0.19429713 | 0.066853751 | 0.180963426 | 0.066434585 |
| 0.20098285 | 0.067200779 | 0.187892045 | 0.066654887 |
| 0.20767042 | 0.067509754 | 0.194484137 | 0.066902299 |
| 0.21435948 | 0.067783934 | 0.20136219 | 0.067219293 |
| 0.22104988 | 0.068025716 | 0.208161319 | 0.067531027 |
| 0.22774153 | 0.068237501 | 0.214961994 | 0.067807003 |
| 0.23443446 | 0.068421675 | 0.221763937 | 0.068049706 |
| 0.24112875 | 0.068580606 | 0.228566908 | 0.068261654 |
| 0.24782458 | 0.068715389 | 0.2353707 | 0.068445387 |
| 0.25452205 | 0.068827692 | 0.242175141 | 0.068603235 |
| 0.26122116 | 0.068919377 | 0.248980113 | 0.068736314 |
| 0.26792178 | 0.068991911 | 0.255785492 | 0.068846514 |
| 0.27462369 | 0.069046512 | 0.26259118 | 0.068935722 |
| 0.28132662 | 0.069084122 | 0.269397095 | 0.069005436 |
| 0.28803028 | 0.069105593 | 0.276203173 | 0.069056868 |
| 0.29473438 | 0.06911129 | 0.283009359 | 0.069091011 |
| 0.30143863 | 0.069102085 | 0.289815609 | 0.06910863 |
| 0.30814267 | 0.069079057 | 0.296621881 | 0.069110154 |
| 0.31484591 | 0.069042581 | 0.303428139 | 0.069096657 |
| 0.32154803 | 0.068992395 | 0.310234356 | 0.06906913 |
| 0.32824871 | 0.068929257 | 0.317040502 | 0.06902766 |
| 0.3349476 | 0.068854513 | 0.323846547 | 0.068972103 |
| 0.34164434 | 0.068767354 | 0.330652477 | 0.068903782 |
| 0.3483387 | 0.06866752 | 0.337458273 | 0.068823343 |
| 0.35503065 | 0.068555537 | 0.344263902 | 0.068729778 |
| 0.36172032 | 0.068431861 | 0.351069341 | 0.068623266 |
| 0.36840796 | 0.068295895 | 0.357874575 | 0.068504395 |
| 0.37509386 | 0.068146673 | 0.364679585 | 0.068373299 |
| 0.38177833 | 0.06798472 | 0.371484324 | 0.068228876 |
| 0.38846165 | 0.067809991 | 0.378288761 | 0.068070824 |
| 0.39514412 | 0.067621504 | 0.385092882 | 0.067899724 |
| 0.40182598 | 0.067419068 | 0.391896644 | 0.06771487 |
| 0.40850748 | 0.067203368 | 0.398699995 | 0.067515467 |
| 0.41518876 | 0.066974178 | 0.405502918 | 0.067301989 |
| 0.42186994 | 0.066730788 | 0.412305398 | 0.067074804 |
| 0.42855111 | 0.066473508 | 0.419107378 | 0.066833144 |
| 0.43523236 | 0.066202444 | 0.425908825 | 0.066576891 |
| 0.44191368 | 0.065917206 | 0.432709721 | 0.066306435 |
| 0.44859506 | 0.065617651 | 0.439510025 | 0.066021467 |
| 0.45527644 | 0.065303594 | 0.446309695 | 0.065721734 |
| 0.46195772 | 0.064974867 | 0.45310869 | 0.06540709 |
| 0.46863881 | 0.064631277 | 0.459906969 | 0.065077335 |
| 0.47531964 | 0.064272451 | 0.466704491 | 0.064732303 |
| 0.4820001 | 0.063897928 | 0.473501201 | 0.064371654 |
| 0.4886801 | 0.063507243 | 0.480297039 | 0.063994929 |
| 0.49535956 | 0.063100338 | 0.487091937 | 0.063601606 |
| 0.50203842 | 0.062677149 | 0.493885843 | 0.063191506 |
| 0.50871661 | 0.062237069 | 0.500678717 | 0.062764654 |
| 0.51539408 | 0.061779608 | 0.507470482 | 0.062320496 |
| 0.52207074 | 0.061304328 | 0.514261055 | 0.061858479 |
| 0.52874655 | 0.060810988 | 0.521050355 | 0.061378131 |
| 0.53542139 | 0.0602992 | 0.527838315 | 0.060879186 |
| 0.5420952 | 0.059768836 | 0.534624852 | 0.060361255 |
| 0.54876793 | 0.059219921 | 0.541409899 | 0.059824155 |
| 0.55543953 | 0.058652464 | 0.548193404 | 0.059267917 |
| 0.56210994 | 0.058066592 | 0.554975313 | 0.058692549 |
| 0.56877914 | 0.05746262 | 0.561755584 | 0.058098178 |
| 0.5754471 | 0.056841088 | 0.56853419 | 0.057485118 |
| 0.58211376 | 0.056202066 | 0.575311132 | 0.056853938 |
| 0.58877904 | 0.055545681 | 0.582086371 | 0.056204727 |
| 0.59544292 | 0.054872031 | 0.588859871 | 0.055537614 |
| 0.60210535 | 0.054181448 | 0.595631595 | 0.054852706 |
| 0.60876634 | 0.053474508 | 0.602401532 | 0.054150359 |
| 0.61542589 | 0.052751624 | 0.609169702 | 0.05343118 |
| 0.62208393 | 0.052012809 | 0.615936106 | 0.052695577 |
| 0.62874038 | 0.051258157 | 0.622700706 | 0.051943555 |
| 0.63539517 | 0.050487757 | 0.629463471 | 0.051175219 |
| 0.6420482 | 0.049701608 | 0.636224373 | 0.050390649 |
| 0.64869935 | 0.048899517 | 0.642983367 | 0.049589813 |
| 0.65534853 | 0.048081384 | 0.649740389 | 0.048772502 |
| 0.66199564 | 0.047247258 | 0.656495386 | 0.047938621 |
| 0.66864067 | 0.046397534 | 0.66324833 | 0.047088273 |
| 0.67528354 | 0.04553245 | 0.669999234 | 0.046221885 |
| 0.68192413 | 0.044651761 | 0.67674808 | 0.045339604 |
| 0.6885623 | 0.043755044 | 0.683494782 | 0.044441075 |
| 0.69519797 | 0.042842331 | 0.690239249 | 0.043525919 |
| 0.70183108 | 0.041913861 | 0.696981456 | 0.042594262 |
| 0.70846161 | 0.040969798 | 0.703721395 | 0.041646337 |
| 0.71508952 | 0.040010167 | 0.710459045 | 0.040682281 |
| 0.72171476 | 0.03903488 | 0.717194363 | 0.039702055 |
| 0.72833734 | 0.03804412 | 0.723927302 | 0.038705626 |
| 0.73495729 | 0.03703822 | 0.730657864 | 0.037693268 |
| 0.74157466 | 0.036017529 | 0.737386067 | 0.03666534 |
| 0.74818951 | 0.034982406 | 0.74411193 | 0.035622217 |
| 0.75480194 | 0.033933266 | 0.75083548 | 0.034564292 |
| 0.76141204 | 0.032870639 | 0.757556764 | 0.033492056 |
| 0.76801992 | 0.031795061 | 0.764275844 | 0.032406096 |
| 0.7746257 | 0.030707078 | 0.770992781 | 0.031306963 |
| 0.7812295 | 0.02960726 | 0.777707655 | 0.030195292 |
| 0.78783144 | 0.028496234 | 0.784420527 | 0.0290716 |
| 0.7944318 | 0.027375452 | 0.791131569 | 0.027937026 |
| 0.8010308 | 0.026246084 | 0.797841006 | 0.026792999 |
| 0.80762873 | 0.025109633 | 0.804549062 | 0.025640905 |
| 0.81422581 | 0.023967208 | 0.811255979 | 0.024482195 |
| 0.82082216 | 0.022819453 | 0.817961912 | 0.023317802 |
| 0.82741775 | 0.021666048 | 0.824666879 | 0.022147866 |
| 0.83401224 | 0.020505137 | 0.831370693 | 0.020971335 |
| 0.84060522 | 0.019334206 | 0.838072796 | 0.019785103 |
| 0.84719715 | 0.018155984 | 0.844773294 | 0.018589833 |
| 0.85378858 | 0.016973462 | 0.851472851 | 0.017389301 |
| 0.86037999 | 0.015789273 | 0.858171878 | 0.016185812 |
| 0.86697275 | 0.014610967 | 0.864871417 | 0.01498518 |
| 0.87356846 | 0.013447686 | 0.871573299 | 0.013797696 |
| 0.88016746 | 0.012301411 | 0.878278267 | 0.012627762 |
| 0.88677005 | 0.011174321 | 0.88498646 | 0.011476467 |
| 0.89337721 | 0.010072607 | 0.891698822 | 0.010349729 |
| 0.89998963 | 0.009001145 | 0.898416142 | 0.009252936 |
| 0.90660819 | 0.007966609 | 0.905139321 | 0.008192654 |
| 0.91323313 | 0.006971915 | 0.911868861 | 0.007173523 |
| 0.91986412 | 0.006016725 | 0.918604395 | 0.006194794 |
| 0.9265021 | 0.005109616 | 0.925346654 | 0.005263502 |
| 0.93314744 | 0.004256482 | 0.932096381 | 0.004388012 |
| 0.93979955 | 0.003456187 | 0.938852854 | 0.003566159 |
| 0.9464605 | 0.002731504 | 0.945617863 | 0.002817862 |
| 0.95313218 | 0.002112785 | 0.952393717 | 0.002175116 |
| 0.95981507 | 0.001629311 | 0.959181102 | 0.0016685 |
| 0.96650801 | 0.001311121 | 0.965978931 | 0.001329665 |
| 0.97320705 | 0.0011756 | 0.972783523 | 0.001178862 |
| 0.97990765 | 0.001209616 | 0.979589744 | 0.001204674 |
| 0.98660648 | 0.001368188 | 0.986394194 | 0.001361998 |
| 0.99330405 | 0.001577422 | 0.993197164 | 0.001574008 |
| 1 | 0.001786945 | 1 | 0.001786945 |

The present invention also provides a rotor for an aircraft, the rotor having at least two improved blades as described above, these improved blades being defined by airfoils that have been modified by the steps of the method of improving a blade. By way of example, the rotor is a advancement propeller of an aircraft, and in particular it is a second advancement propeller of a hybrid helicopter, this second advancement propeller delivering a forward aerodynamic force to the hybrid helicopter during forward flight and a reverse aerodynamic force during hovering flight.

The present invention also provides a rotary wing aircraft comprising a fuselage, at least one main rotor, and at least two advancement propellers. At least one of the advancement propellers of the aircraft is a rotor as described above and includes at least two improved blades defined by airfoils that have been modified by the above-described method of improving a blade.

BRIEF DESCRIPTION OF THE DRAWINGS

The invention and its advantages appear in greater detail in the context of the following description of embodiments given by way of illustration and with reference to the accompanying figures, in which.

Elements present in more than one of the figures are given the same references in each of them.

DETAILED DESCRIPTION OF THE INVENTION

Figure 1:
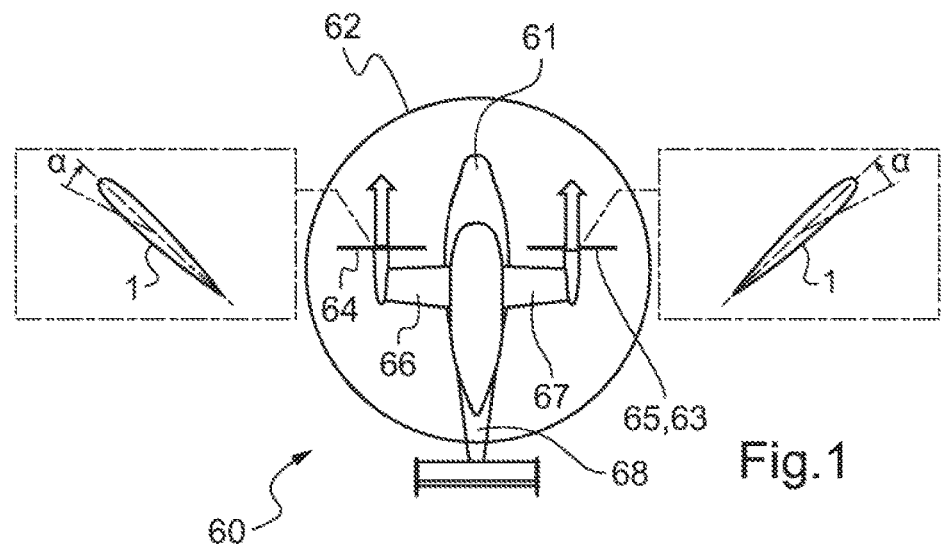
FIGS. 1 and 2 show a hybrid helicopter.
Figure 2:
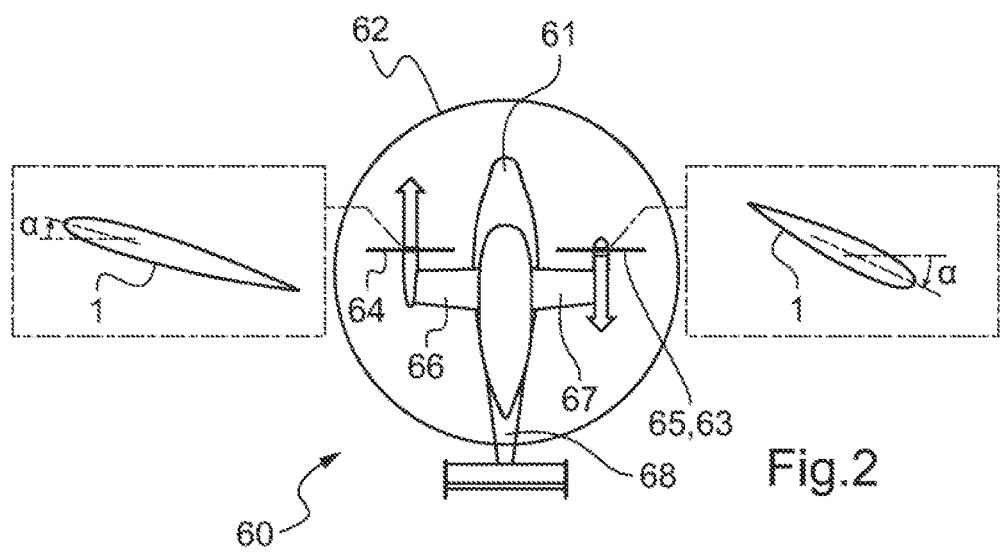

FIGS. 1 and 2 show a single hybrid helicopter 60 in plan view together with detail views of a blade 1 of each advancement propeller 64, 65 of the hybrid helicopter 60. In FIG. 1, the hybrid helicopter 60 is in forward flight, whereas in FIG. 2, the hybrid helicopter 60 is in hovering flight.

The hybrid helicopter 60 is a rotary wing aircraft comprising a fuselage 61, a main rotor 62, two half-wings 66 and 67 arranged on either side of the fuselage 61, a tail boom 68, and two advancement propellers 64 and 65. The two advancement propellers 64 and 65 are positioned on either side of the fuselage 61, each at the end of a respective half-wing 66, 67.

Figure 3:
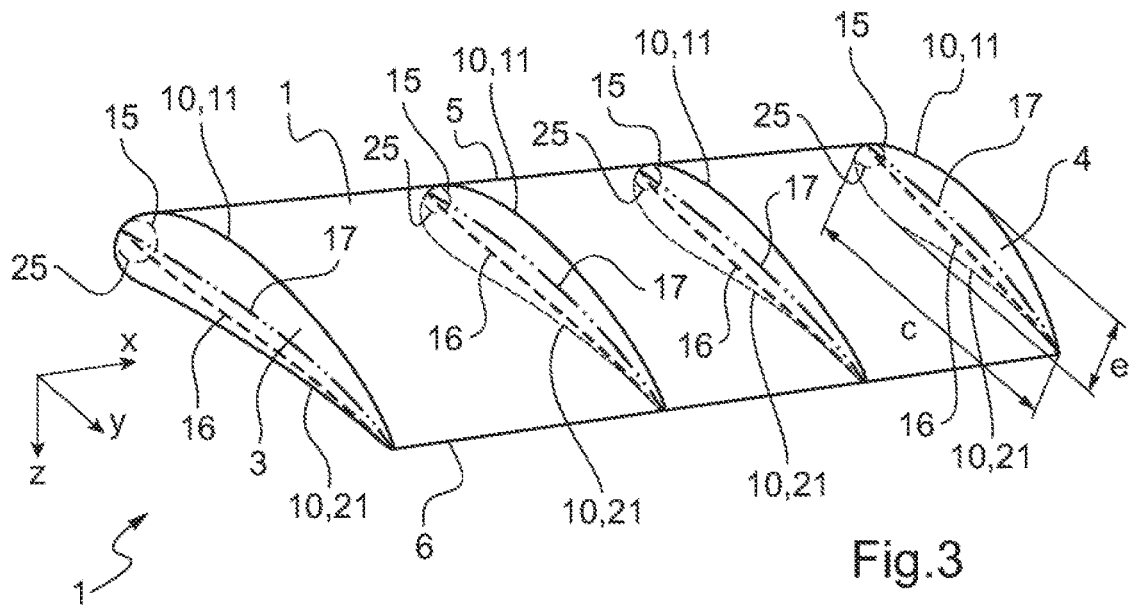
FIG. 3 shows a blade.

A blade 1 is shown in FIG. 3. This blade 1 may form part of the main rotor 62 or indeed of a advancement propeller 64, 65. An (X, Y, Z) reference frame is shown in FIG. 3, being made up of a longitudinal direction X, a transverse direction Y, and a vertical direction Z, these three directions being mutually perpendicular. The longitudinal direction X is substantially parallel to a pitch-varying axis of the blade 1, and possibly coincides therewith.

The blade 1 extends in the longitudinal direction X spanwise from a first end 3 to a second end 4, and in the transverse direction Y from a leading edge 5 to a trailing edge 6. The blade 1 has successive cross-sections in planes parallel to the transverse and vertical directions Y and Z, each cross-section being defined by an airfoil 10 made up in particular of two half-airfoils 11 and 21, namely a suction side half-airfoil 11 and a pressure side half-airfoil 21. The suction half-airfoil 11 and the pressure side half-airfoil 21 comprise respectively a leading edge segment 12, 22 starting at the leading edge 5, a terminal segment 14, 24 terminating at the trailing edge 6, and an intermediate segment 13, 23 situated between the leading edge segment 12, 22 and the terminal segment 14, 24. The leading edge segments 12, 24 of the suction side half-airfoil 11 and of the pressure side half-airfoil 21 are formed by portions of respective initial leading edge circles 15, 25.

The airfoils 10 of these cross-sections generally vary according to their span position along the blade 1 and can therefore differ, in particular in order to be adapted to the air flow received by each cross-section during rotation of the blade 1.

FIG. 3 also shows a half-thickness line or "camber line" 17 of the airfoil 10. Perpendicularly to the camber line 17, this camber line 17 is at equal distances from the pressure side and suction half-airfoils 21 and 11. It can be seen that the airfoils 10 of the blade 1 are asymmetrical and present camber, the camber line 17 being curved. A straight line segment 16 connecting the leading edge 5 to the trailing edge 6 is also shown in FIG. 3 for a plurality of airfoils 10. This straight line segment 16 corresponds to the chord of each airfoil 10.

Figure 4:
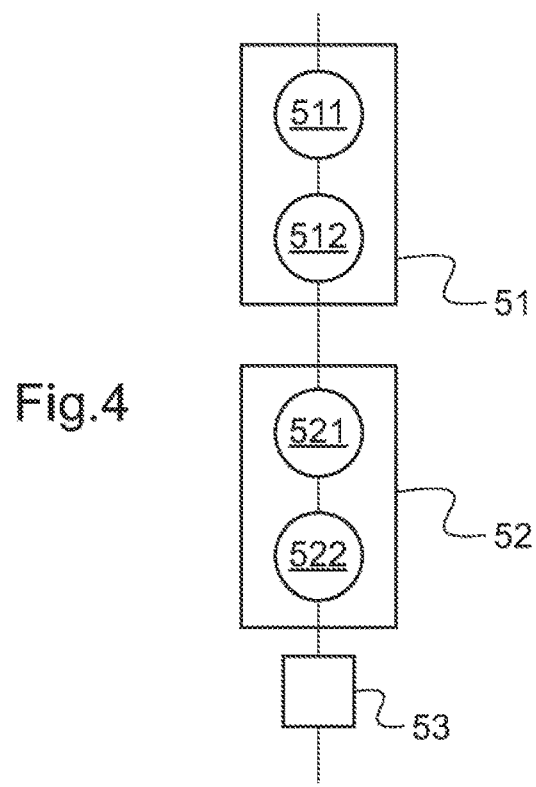
FIG. 4 is a flow chart of a method of improving a blade.

FIG. 4 is a flow chart summarizing a method of improving an initial blade in order to constitute a modified blade referred to as an "improved blade", this method comprising a plurality of steps. This method is for applying to blades having successive cross-sections formed by existing airfoils, e.g. from the NACA families or the OA families.

This method of improving a blade 1 is intended particularly for the airfoils 10 having leading edge segments 12, 22 of their half-airfoils 11, 21 that are defined by portions of respective initial leading edge circles 15, 25 as shown in FIG. 3. Each initial leading edge circle 15, 25 of a half-airfoil 11, 21 is then characterized by its radius and by the position of its center. For each airfoil 10, the initial leading edge circle 15 of the suction side half-airfoil 11 and the initial circle of the leading edge 25 of the pressure side half-airfoil 21 have centers that coincide and radii that are equal.

Nevertheless, this method of improving a blade 1 can equally well be applied to airfoils 10 in which the leading edge segment 12, 22 of the half-airfoils 11, 21 are not portions of circles, with an initial leading edge circle 15, 25 then being previously estimated for each half-airfoil 11, 21 of each airfoil 10. This initial leading edge circle 15, 25 of a half-airfoil 11, 21 may be determined by any appropriate method including using a geometrical construction as shown in FIG. 5 for the suction side half-airfoil 11.

This method of improving a blade 1 then includes a preliminary step of determining an initial leading edge circle 15, 25 of at least one half-airfoil 11, 21 of each airfoil 10, this initial leading edge circle 15, 25 being estimated from the leading edge segment 12, 22 of the half-airfoil 11, 21.

During this preliminary step, an initial leading edge circle 15 of the suction side half-airfoil 11 and an initial leading edge circle 25 of the pressure side half-airfoil 21 can be estimated respectively from the leading edge segments 12 and 22 of the suction side half-airfoil 11 and of the pressure side half-airfoil 22.

Figure 5:
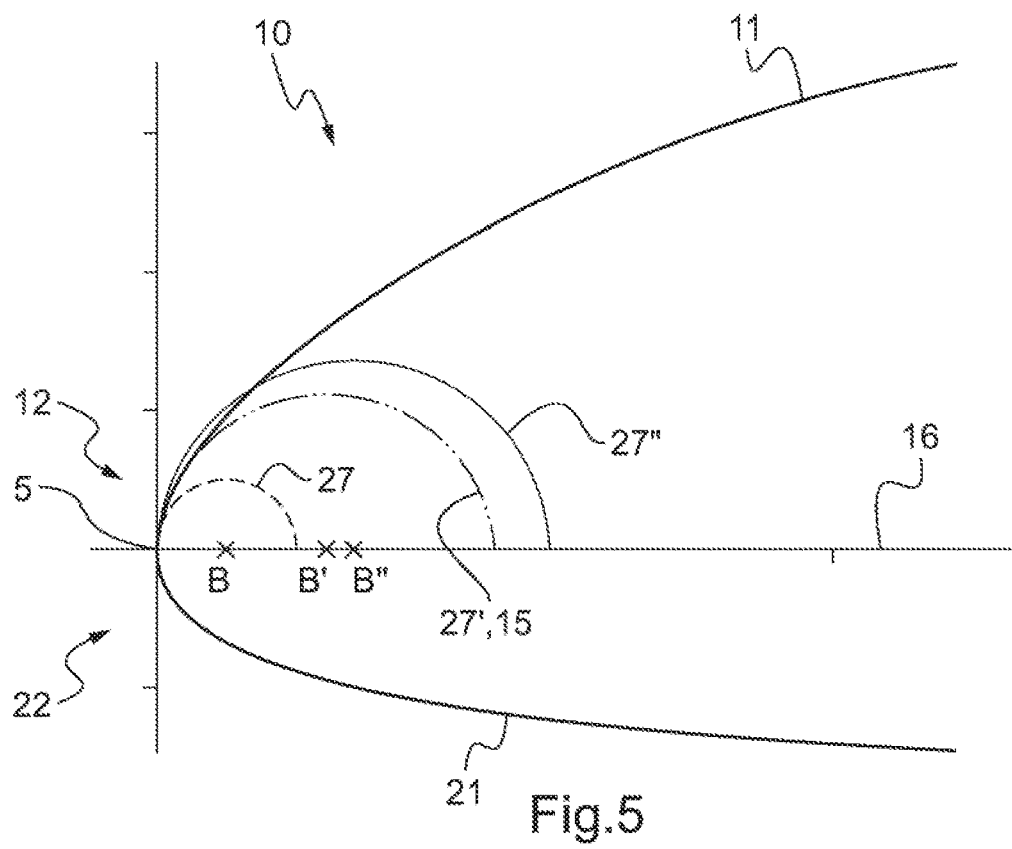
FIG. 5 is a diagram for constructing an initial leading edge circle of a half-airfoil.

This preliminary step of determining an initial leading edge circle 15, 25 is applied to the suction side half-airfoil 11 of an airfoil 10 in FIG. 5. Initially, a straight line segment connecting the leading edge 5 to the trailing edge 6 of the airfoil 10 is defined, this straight line segment 16 corresponding to the chord of the airfoil 10.

Thereafter, a construction circle 27 is created, this construction circle 27 passing through the leading edge 5, the center B of this construction circle 27 being situated on the straight line segment 16. Furthermore, the construction circle 27 is inscribed in the suction side half-airfoil 11. The construction circle 27 could equally well be tangential to the leading edge segment 12 of the suction side half-airfoil 11 in the particular situation where the tangential direction of the leading edge segment 12 at the leading edge 5 is perpendicular to the straight line segment 16.

Thereafter, the radius of the construction circle 27 is increased, the center B of the construction circle 27 then being shifted along the straight line segment 16 with the construction circle passing through the leading edge 5. The radius of the construction circle 27 is thus increased until the construction circle 27 intersects the suction side half-airfoil 11. The construction circle 27" of center B" represents the first construction circle 27 intersecting the leading edge segment 12.

Finally, the initial leading edge circle 15 of the suction side half-airfoil 11 is determined as the largest construction circle 27' inscribed inside the suction side half-airfoil 11. The center of the initial leading edge circle 15 is the center B' of this largest construction circle 27' and it is situated on the straight line segment 16. The radius of the initial leading edge circle 15 is the greatest radius for this construction circle 27'. Specifically, the greatest construction circle 27' corresponds to the construction circle 27 defined by the iteration preceding the construction circle 27", which is the first construction circle 27 that intersects the leading edge segment 12, and which also corresponds to the first construction circle 27 that is not inscribed inside the suction side half-airfoil 11.

This preliminary step of determining an initial leading edge circle 15, 25 for at least one half-airfoil 11, 21 may also be applied to the pressure side half-airfoil 21 of the airfoils 10 of a blade 1. This preliminary step may also be applied simultaneously to the suction side half-airfoil 11 and to the pressure side half-airfoil 21 of the airfoils 10 of a blade 1.

The initial leading edge circle 15, 25 may thus be defined by a center situated on the straight line segment 16 and by a radius. This initial leading edge circle 15, 25 thus serves to characterize the leading edge segment 12, 22 of a half-airfoil 11, 21 of an airfoil 10 of a blade 1, a portion of this initial leading edge circle 15, 25 replacing the leading edge segment 12, 22 of the suction side half-airfoil 11.

Thereafter, this method of improving a blade 1 comprises a first step 51 of modifying at least one half-airfoil 11, 21 of each airfoil 10 of the blade 1.

Figure 6:
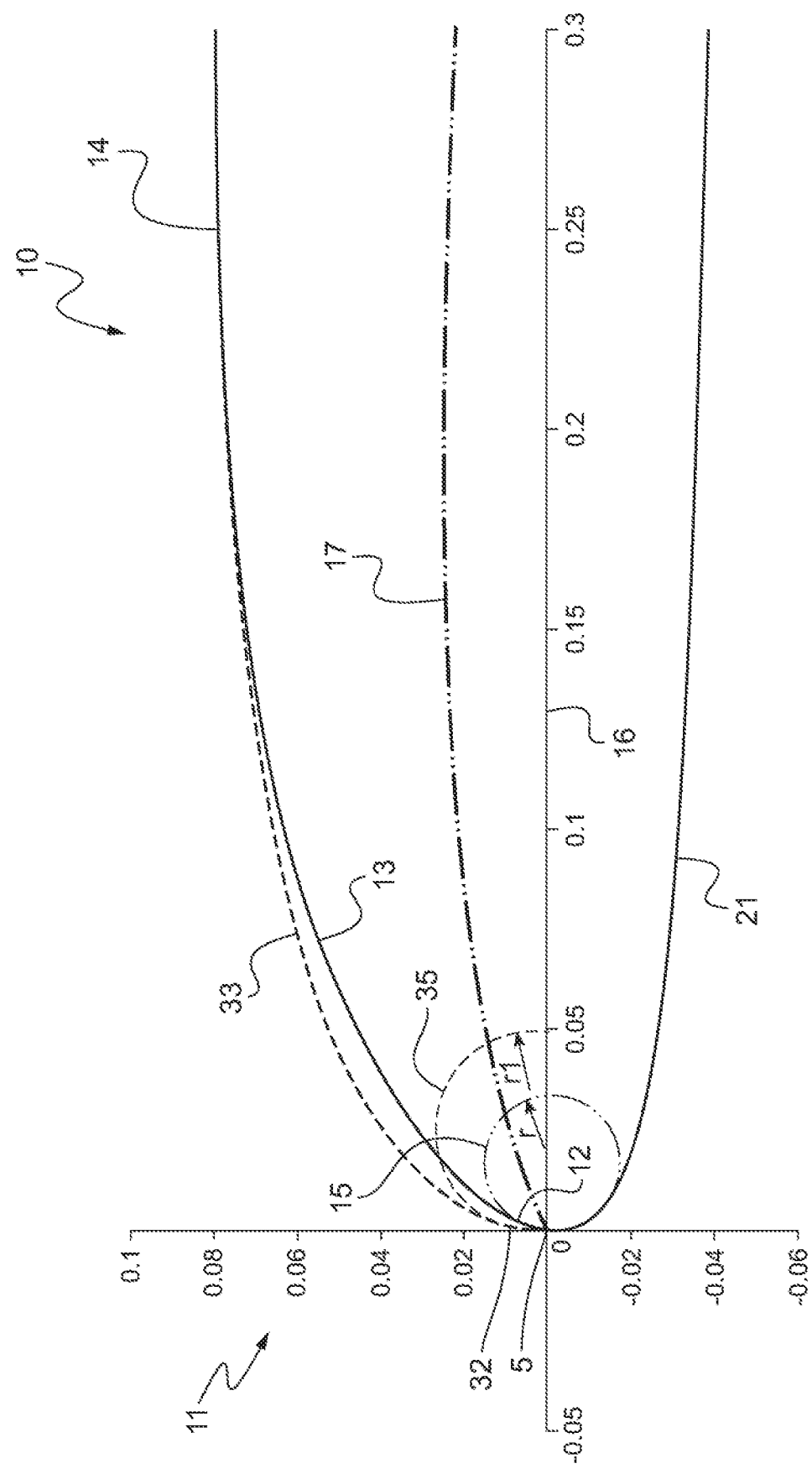
FIGS. 6 to 9 are three modified airfoils of a blade.
Figure 7:
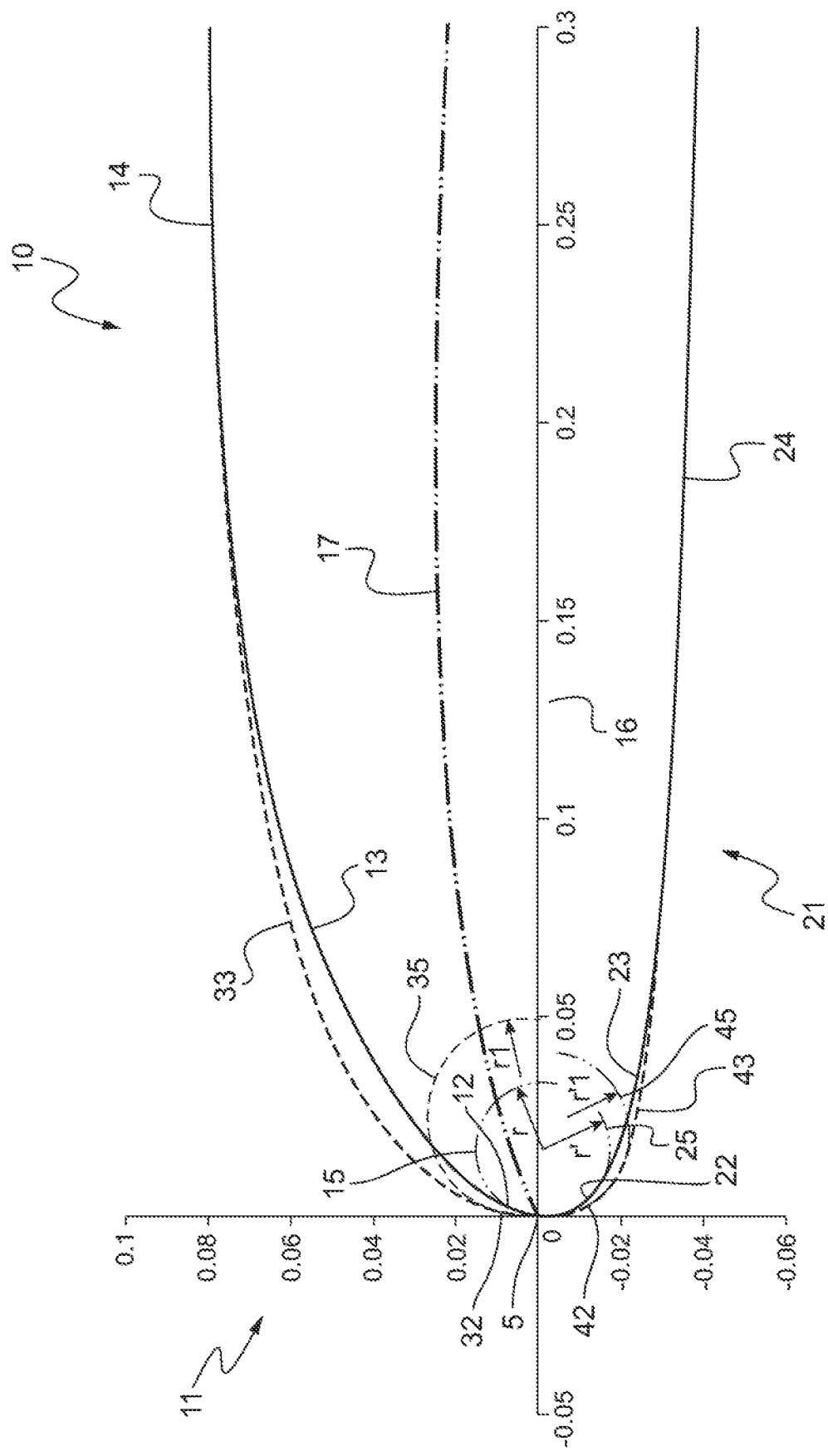

Such a modification of a suction side half-airfoil 11 is shown in FIGS. 6 and 7. In FIG. 6, only the suction side half-airfoil 11 is modified, whereas in FIG. 7 both the suction half-airfoil 11 and the pressure side half-airfoil 21 are modified, the initial leading edge circle 15 of the suction side half-airfoil 11 and the initial leading edge circle 25 of the pressure side half-airfoil 21 being identical and coinciding.

In this first step 51, the initial leading edge circle 15, 25 of a half-airfoil 11, 21 is modified for each airfoil 10 of the blade 1 by increasing its radius $\underline{r}$, the position of the leading edge 5 remaining unchanged. Under such circumstances, a new leading edge circle 35, 45 is defined by a new radius $r_1$ and a center that is moved towards the trailing edge 6. A new leading edge segment 32, 42 of the half-airfoil 11, 21 is then constituted by a portion of this new leading edge circle 35, 45.

An application of this first step 51 is to modify the suction side half-airfoil 11 of an airfoil 10, as shown in FIG. 6. This first step 51 comprises the following plurality of substeps 511-512.

During a first substep 511, the radius of the initial leading edge circle 15 of this suction side half-airfoil 11 is increased and its center is moved so as to form a new leading edge circle 35 for this suction side half-airfoil 11. The new leading edge circle 35 is tangential to the initial leading edge circle 15 of this suction side half-airfoil 11 at said leading edge 5 of the airfoil 10. A portion of this new leading edge circle 35 then constitutes a new leading edge segment 32 of this suction side half-airfoil 11.

During a second substep 512, a new intermediate segment 33 of this suction side half-airfoil 11 is defined so as to replace the initial intermediate segment 13 and connect the new leading edge circle 35 to the terminal segment 14 of this suction side half-airfoil 11.

This new intermediate segment 33 connects the new leading edge segment 32 tangentially to the terminal segment 14, which remains unchanged, the new leading edge segment 32 passing through the leading edge 5 and being tangential to the initial leading edge circle 15 at the leading edge 5. The new intermediate segment 33 must have no point of inflection and its tangent varies continuously.

This first step 51 may also be applied to modifying the pressure side half-airfoil 21 of an airfoil 10. This first step 51 can also be applied to modifying the suction side half-airfoil 11 and the pressure side half-airfoil 21 of an airfoil 10. Such a modification of a suction side half-airfoil 11 and of a pressure side half-airfoil 21 is shown in FIG. 7, the initial leading edge circle 15 of the suction side half-airfoil 11 and the initial leading edge circle 25 of the pressure side half-airfoil 21 being identical and coinciding. During this first step 51, the initial leading edge circle 15 of the suction side half-airfoil 11 and the initial leading edge circle 14 of the pressure side half-airfoil 21 are modified in different ways, the new initial leading edge circle 35 of the suction side half-airfoil 11 and the new initial leading edge circle 45 of the pressure side half-airfoil 21 being different.

Following this modification of at least one half-airfoil 11, 21 of each airfoil 10 of the blade 1, the flow of air over the half-airfoils 11, 21 of the blade 1 is modified, giving rise to a reduction in algebraic value of the positive and negative stall angles of attack $\alpha_{dp}$ and $\alpha_{dn}$ of the blade 1. Consequently, the aerodynamic performance of the modified blade 1 is improved under negative angles of attack $\alpha$ without degrading its aerodynamic performance under positive angles of attack $\alpha$, with the zone in which the blade 1 is utilized under positive angles of attack $\alpha$ remaining smaller than the positive stall angle of attack $\alpha_{dp}$ of the modified blade 1.

The blade 1 as modified in this way is optimized for fitting to a rotor 63 that is to deliver an aerodynamic force in two opposite directions, respectively under a positive angle of attack and under a negative angle of attack. By way of example, his rotor 63 may constitute one of the two advancement propellers 64, 65 of the hybrid helicopter 60 shown in FIGS. 1 and 2.

Specifically, during forward flight as shown in FIG. 1, the two advancement propellers 64, 65 of the hybrid helicopter 60 deliver substantially identical aerodynamic forces both directed towards the front of the hybrid helicopter 60. The blades 1 of these advancement propellers 64, 65 have positive angles of attack $\alpha$, as shown in FIG. 1.

In contrast, during hovering flight as shown in FIG. 2, the two advancement propellers 64 and 65 deliver opposite aerodynamic forces, a first advancement propeller 64 arranged on the left of the fuselage 61 delivering an aerodynamic force directed towards the front of the hybrid helicopter 60, while a second advancement propeller 65 arranged on the right of the fuselage 61 delivering an aerodynamic force directed towards the rear of the hybrid helicopter 60. The blades 1 of the first advancement propeller 64 thus have a positive angle of attack α as shown in FIG. 2, while the blades 1 of the second advancement propeller 65 have a negative angle of attack α.

Figure 12:
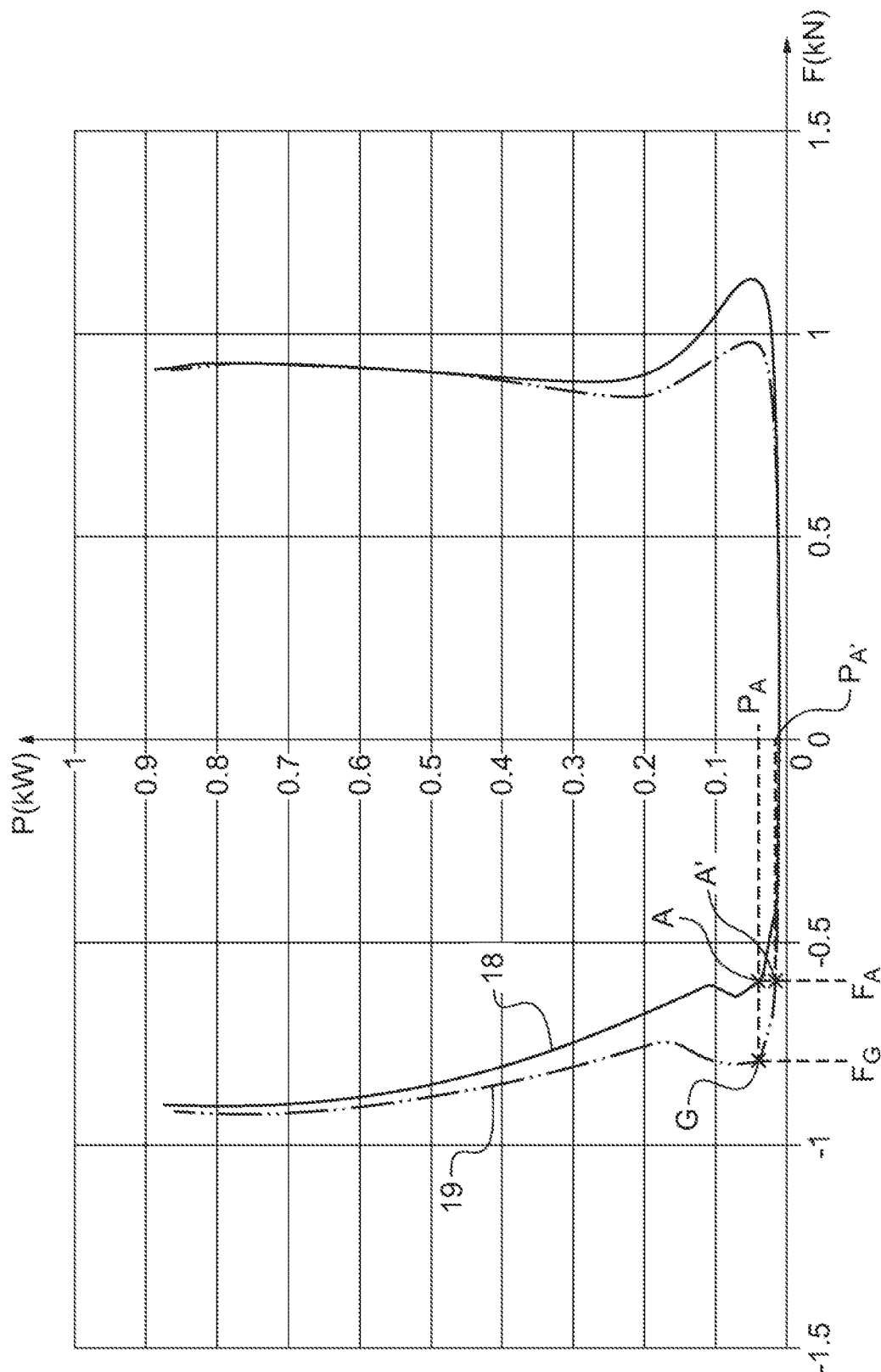
FIG. 12 plots two curves relating the thrust F from a blade with the power P it consumes.

Each modified blade 1 fitted to the second advancement propeller 65 thus enables it to deliver the aerodynamic force F needed for hovering flight under a negative angle of attack α that is further away from the negative stall angle of attack $α_{dn}$ of the modified blade 1 than it would be for a blade that is not modified. As shown in FIG. 12, this is accompanied by the power needed for driving rotation of the second advancement propeller 65 for the purpose of delivering this aerodynamic force F needed for hovering flight under a negative angle of attack α potentially being smaller compared with a advancement propeller having non-modified blades 1. FIG. 12 plots two curves 18 and 19 associating the aerodynamic force F from a blade 1 plotted along the abscissa with the power P consumed by that blade 1 plotted up the ordinate. A first curve 18 corresponds to a non-modified blade 1, and a second curve 19 corresponds to a modified blade 1.

By way of example, it can be seen that for the blade 1 consuming a given power $P_A$, a point A on the first curve 18 corresponds to a first aerodynamic force $F_A$ that is less than a second aerodynamic force $F_G$ corresponding to the point G on the second curve 19.

It can also be seen that for a given aerodynamic force $F_A$ generated by a blade, the blade 1 with modified airfoils 10 consumes power $P_{A'}$, corresponding to a point A' on the second curve 19 that is less than the power $P_A$ consumed by a blade 1 having airfoils 10 that are not modified and corresponding to the point A on the first curve 18.

During application of this first step 51, the thickness e of the airfoil 10 remains unchanged for each airfoil 10 of the blade 1 while its chord c may be modified a little. Furthermore, the new intermediate segment 33, 43 of a half-airfoil 11, 21 begins respectively on the new leading edge circle 35, 45 of the half-airfoil 11, 21 at a first distance from the leading edge, which is a minimum transverse distance lying in the range 0.5% to 5% of the chord c of the airfoil 10. The new intermediate segment 33, 43 of a half-airfoil 11, 21 connects with the terminal segment 14, 24 of that half-airfoil 11, 21 at a respective second distance from the leading edge 5, which is a transverse distance that is less than or equal to 25% of the chord c.

Modifying the airfoils 10 of a blade 1 in compliance with this first step 51 suffices to improve the aerodynamic performance of the blade 1. Nevertheless, the method of improving a blade 1 may also include a second step 52 of moving the leading edge 5 for each airfoil 10 of the blade 1. In this second step 52, the leading edge 5 of each airfoil 10 of the blade 1 is moved away from the pressure side half-airfoil 21 towards the suction side half-airfoil 11 through a third distance d, perpendicularly to the straight line segment 16, the suction side and pressure side half-airfoils 11 and 21 being modified accordingly. This second step 52 has two substeps 521 and 522.

Figure 8:
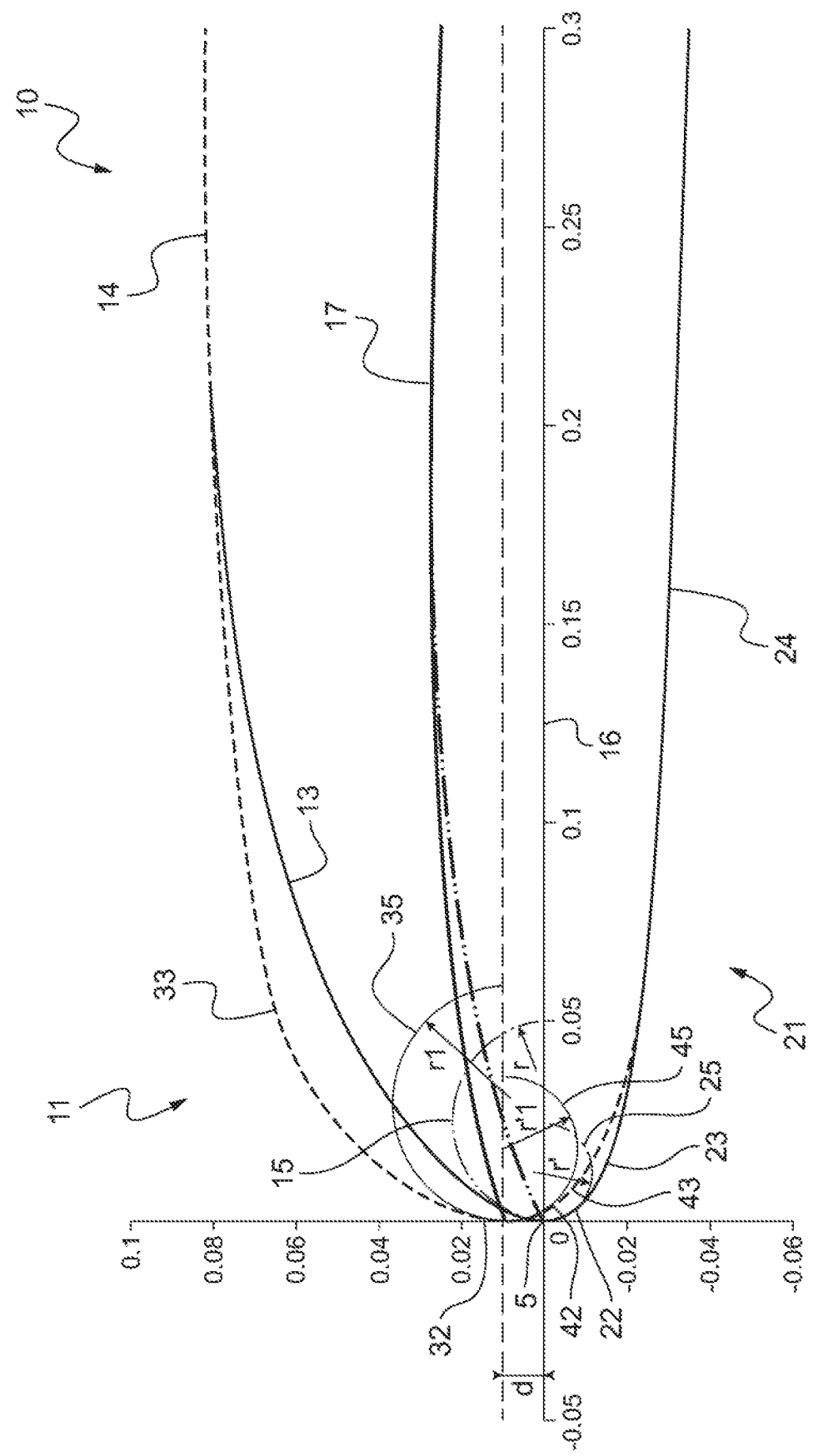
Figure 9:
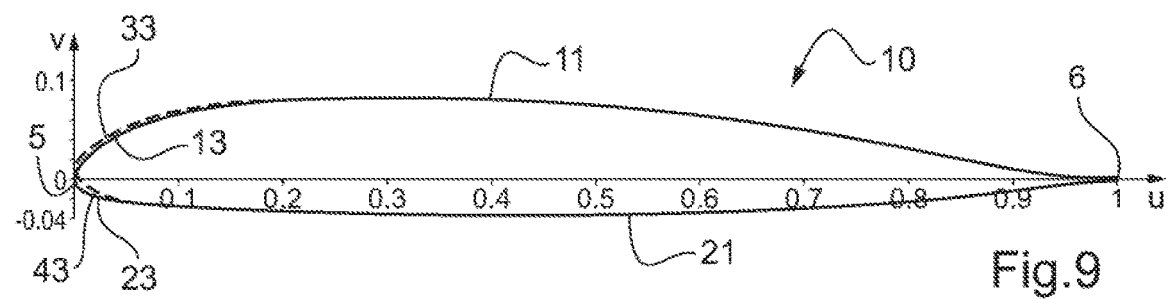

In FIGS. 8 and 9, the leading edge 5 of the airfoil 10 is moved after increasing the radii of the initial leading edge circles 15, 25 of the suction side half-airfoil 11 and of the pressure side half-airfoil 21 of the airfoil 10. Nevertheless, the leading edge 5 may be moved after prior modification of only one of these two half-airfoils 11 and 21. FIG. 9 shows the airfoil 10 in full, whereas FIG. 8 shows only a zone of this airfoil 10 in the proximity of the leading edge 5, as in FIGS. 6 and 7. It can be seen in FIG. 8 that the initial leading edge circles 15, 25 of the suction side half-airfoil 11 and of the pressure side half-airfoil 21 of the airfoil 10 have radii and centers that are different.

During a first substep 521, the leading edge 5 of the airfoil 10 is moved through the third distance d perpendicularly to the straight line segment 16 from the pressure side half-airfoil 21 towards the suction side half-airfoil 11. The new leading edge segment 32 of the suction side half-airfoil 11 is also moved, as is the new leading edge segment 42 of the pressure side half-airfoil 21.

During a second substep 522, a new intermediate segment attached to the suction side half-airfoil 11 and a new intermediate segment 43 attached to the pressure side half-airfoil 21 are defined. The new intermediate segment 33 attached to the suction side half-airfoil 11 connects the moved new leading edge segment 32 of this suction side half-airfoil 11 to the terminal suction side segment 14 of this suction side half-airfoil 11, the terminal segment 14 remaining unchanged. Likewise, the new intermediate segment 43 attached to the pressure side half-airfoil 21 connects the moved new leading edge segment 42 of this pressure side half-airfoil 21 to the terminal segment 24 of this pressure side half-airfoil 21, the terminal segment 24 remaining unchanged.

The new intermediate segment 33 of the suction side half-airfoil 11 and the new intermediate segment 43 of the pressure side half-airfoil 21 are then tangential respectively to the new leading edge segment 32 of the suction side half-airfoil 11 and to the new leading edge segment 42 of the pressure side half-airfoil 21 and respectively to the terminal segment 14 of the suction side half-airfoil 11 and to the terminal segment 24 of the pressure side half-airfoil 21. The new intermediate segment 33 of the suction side half-airfoil 11 and the new intermediate segment 43 of the pressure side half-airfoil 21 still include no point of inflection and still have tangents that vary continuously.

This movement of the leading edge 5 following the second step 52 leads to a modification of the camber line 17 of the airfoil 10 in the zone of the leading edge 5. By way of example, the third distance d lies in the range 0.5% to 2% of the chord c of the airfoil 10. This movement of the leading edge 5 also gives rise to a small increase in the chord c of the airfoil 10. This small increase in the chord c is of the order of a few hundredths of a percent, the new chord c' of the airfoil 10 being defined by the following equation:

$$c' = \sqrt{c^2 + d^2}$$

For example, for a third distance d less than or equal to 2% of the chord c of the airfoil 10, this increase in the chord c is less than 0.02%.

This small increase in the chord c is merely a consequence of moving the leading edge 5 of the airfoil 10 in the second step 52 has no direct effect on the improvements of the aerodynamic performance of the airfoil 10. Specifically, it is the combined modifications of the leading edge 5, i.e. increasing at least one radius of the initial leading edge circle 15, 25 of the suction side and/or pressure side half-airfoil 11 and/or 21 and the moving thereof that lie behind the improvement in this aerodynamic performance of the airfoil 10.

This movement of the leading edge 5, whether it is performed after modifying the airfoils 10 solely in the suction side half-airfoil 11, solely in the pressure side half-airfoil 21, or indeed in both the suction side and the pressure side half-airfoils 11 and 21 leads to a reduction in the positive and negative stall angles of attack $\alpha'_{dp}$ and $\alpha'_{dn}$ of the modified blade 1 that are greater than for a blade 1 in which only the radius of the initial leading edge circle 15, 25 of one or two half-airfoils 11, 21 has been modified by modifying the flow of air over the suction side and pressure side half-airfoils 11 and 21 of the modified blade 1.

Figure 10:
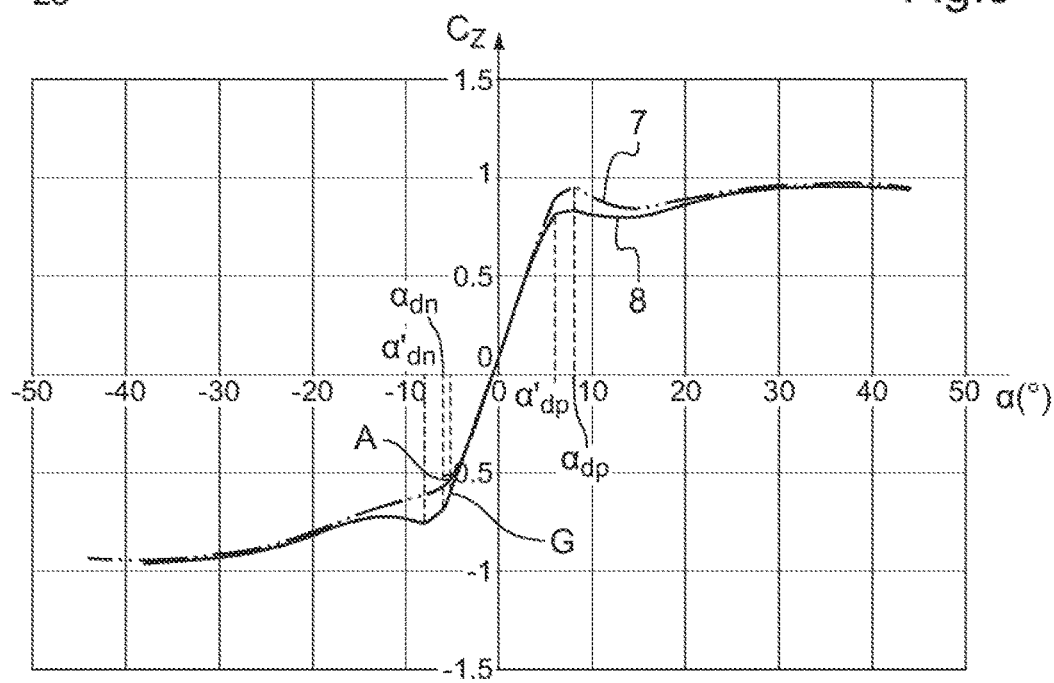
FIG. 10 plots curves showing the variation in the lift coefficient of the blade as a function of its angle of attack.

A first graph showing this reduction in the positive and negative stall angles of attack $\alpha_{dp}$ and $\alpha_{dn}$ of the blade 1 having its airfoils 10 modified in application of both steps 51 and 52 of the method of improving a blade 1 is plotted in FIG. 10. This graph shows the variation in the lift coefficient Cz of the blade 1 as a function of the angle of attack $\alpha$ of the blade 1 relative to the flow of air over the blade 1 firstly in a first graph 7 for a blade 1 that is not modified and secondly in a second graph 8 for a blade 1 that is modified. The angle of attack $\alpha$ is plotted along the abscissa and the lift coefficient Cz is plotted up the ordinate.

It can be seen that the positive and negative stall angles of attack $\alpha'_{dp}$ and $\alpha'_{dp}$ of the blade 1 modified in both steps 51 and 52 shown on the second graph 8 are smaller than the positive and negative stall angles of attack $\alpha_{dp}$ and $\alpha_{dn}$ of the non-modified blade as shown by the first graph 7.

It can also be seen that for a negative angle of attack $\alpha$ substantially equal to −5°, a non-modified blade is operating close to its negative stall angle of attack $\alpha_{dn}$, the corresponding point A not being situated on the linear portion of the first graph 7, whereas the point G corresponding to the same negative angle of attack $\alpha$ substantially equal to −5° is situated on the linear portion of the second graph 8 for the modified blade 1 thus operating with an angle of attack that is further away from its negative stall angle of attack $\alpha'_{dn}$.

Consequently, the aerodynamic performance of the modified blade 1 is better than that of the non-modified blade, as described above and shown in FIG. 12, and, for given power consumption Pc, this modified blade 1 can deliver an aerodynamic force F that is greater than a non-modified blade. Likewise, such a modified blade requires power consumption that is less than that of a non-modified blade in order to be driven in rotation so as to provide the necessary aerodynamic force F. For example, for a second propeller 65 of a hybrid helicopter 60 of medium weight using such blades 1 modified in accordance with both steps 51 and 52, the power saving that is obtained may be of the order of 100 kilowatts.

Figure 11:
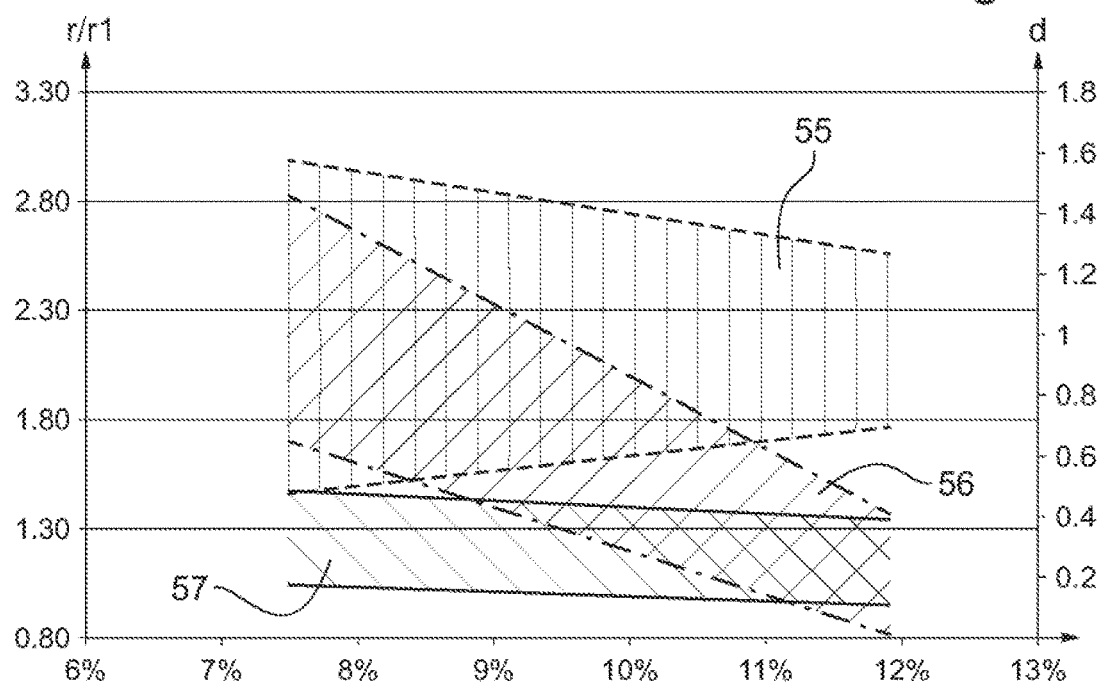
FIG. 11 plots curves showing the variations in the characteristics of the modifications to an airfoil as a function of its relative thickness.

The modifications applied to the airfoils 10 of the blade 1 in each of the steps 51 and 52 can thus be influenced by the relative thickness of those airfoils 10, as shown in the second graph of FIG. 11. This second graph shows a first envelope 55 for variation of a first ratio of the radius $r_1$ of the new leading edge circle 35 of a suction side half-airfoil 11 divided by the radius $r$ of the initial leading edge circle 15 of this suction side half-airfoil 11, as a function of variations in the relative thickness of the airfoil 10. This second graph shows a second envelope 56 for variation of a second ratio of the radius $r'_1$ of the new leading edge circle 45 of a pressure side half-airfoil 21, divided by the radius $r'$ of the initial leading edge circle 25 of a pressure side half-airfoil 21 as a function of variations in the relative thickness of the airfoil 10. The relative thickness of the airfoil 10 is plotted along the abscissa and the first and second ratios are plotted up the ordinate.

The variations of these ratios are shown in FIG. 11 for airfoils 10 of relative thickness lying in the range 7.5% to 12%, the method of improving a blade 1 of the invention being particularly adapted to blades formed by these airfoils 10. Nevertheless, this method of improving a blade 1 can also be applied to blades 1 formed by airfoils 10 of relative thickness that is different.

It can be seen that the first ratio relating to the new leading edge circle 35 of a suction side half-airfoil 11, with its variation being represented by the first envelope 55, is little influenced by the increase in the relative thickness of the airfoil 10, unlike the second ratio relating to the new leading edge circle of a pressure side half-airfoil 21, of variation that is represented by the second envelope 56 and that tends to decrease as the relative thickness of the airfoil increases.

The second graph also shows a third envelope 57 for variation of the third distance $d$ through which the leading edge 5 is moved as a function of variations in the relative thickness of the airfoil 10. The relative thickness of the airfoil 10 is plotted along the abscissa and the third distance $d$, expressed as a percentage of the chord $c$, is plotted up the ordinate. It can be seen that the width of this third envelope 57 tends to decrease when the relative thickness of the airfoil 10 increases, the mean value of this third envelope 57 being substantially constant.

Finally, the method of improving a blade 1 may also include a third step 53 of fabricating a blade 1 seeking to fabricate a blade 1 defined by the airfoils 10 as modified during the preceding steps. These airfoils 10 may be modified by using the first step 51 only, or else by using both the first and second steps 51 and 52.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of designing a propeller blade based upon a predetermined basis blade, the predetermined basis and propeller blades extending in a longitudinal direction (X) spanwise from a first end to a second end and in a transverse direction (Y) from respectively basis and resulting leading edges to respectively basis and resulting trailing edges, the predetermined basis and propeller blades having respective basis and resulting cross-sections, succeeding along the longitudinal direction (X), each basis and resulting cross-sections being defined by respectively basis and resulting airfoils, such that each basis and resulting airfoil is respectively defined by two respectively basis and resulting half-airfoils, including a respectively basis and resulting suction side half-airfoil and a respectively basis and resulting pressure side half-airfoil, the respectively basis and resulting two half-airfoils each comprising, respectively: a basis and resulting leading edge segment, a basis and resulting intermediate segment, and a basis and resulting terminal segment, the resulting leading edge segment of each half-airfoil being formed by a portion of a basis leading edge circle of the predetermined basis blade, the basis leading edge circle having a basis radius; wherein the method comprises:

a first step of modifying at least one basis half-airfoil of each basis airfoil to obtain the at least one resulting half-airfoil of each resulting airfoil;

a second step of moving the leading edge for each resulting airfoil of the resulting blade, relatively to the basis leading edge for each basis airfoil of the basis blade; and a third step of fabricating the resulting blade with the resulting airfoils;

the first step having the following substeps of:
  increasing for the at least one resulting half-airfoil, the basis radius of the basis leading edge circle for the at least one resulting half-airfoil so as to form a resulting leading edge circle having an increased resulting radius; the at least one resulting half-airfoil having a portion that constitutes the resulting leading edge segment, the resulting leading edge circle being tangential to the basis leading edge circle of the at least one basis half-airfoil at the resulting leading edge; and
  defining a new intermediate segment for the at least one resulting half-airfoil by replacing the basis intermediate segment connecting the resulting leading edge circle to a terminal segment of the at least one half-airfoil in such a manner to increase a negative stall angle of a resulting attack angle with respect to a basis attack angle of the basis blade; and
the second step having the following substeps:
  moving the leading edge for each resulting airfoil of the resulting blade, relatively to the basis leading edge of each basis airfoil, through a third distance $\underline{d}$ perpendicularly to a straight line segment connecting the basis leading edge to the basis trailing edge, from the resulting pressure side half-airfoil towards the resulting suction side half-airfoil, with the resulting leading edge segment of the resulting airfoil also being moved; and
  refining a resulting intermediate segment for each of the resulting two half-airfoils by connecting the basis leading edge segment of both of the resulting half-airfoils to the resulting terminal segments of both of the resulting half-airfoils.

2. The method according to claim 1, wherein during the first step, both of the two basis half-airfoils of each basis airfoil are modified.

3. The method according to claim 1, wherein for each resulting airfoil of the resulting blade, the resulting radius of the resulting leading edge circle of the resulting suction side half-airfoil lies in the range 110% to 140% of the basis radius of the basis leading edge circle of the basis suction side half-airfoil, and the resulting radius of the resulting leading edge circle of the resulting pressure side half-airfoil lies in the range 115% to 220% of the basis radius of the basis leading edge circle of the basis pressure side half-airfoil.

4. The method according to claim 1, wherein for the at least one resulting half-airfoil of each resulting airfoil of the resulting blade, the new intermediate segment begins on the resulting leading edge segment at a first distance from the resulting leading edge, which first distance is a minimum transverse distance lying in the range 0.5% to 5% of a chord ($\underline{c}$) of the resulting airfoil and connects with the resulting terminal segment at a second distance from the resulting leading edge, which second distance is a transverse distance equal to at most 25% of the chord ($\underline{c}$), the chord ($\underline{c}$) being equal to the distance between the resulting leading edge and the resulting trailing edge of the resulting airfoil.

5. The method according to claim 1, the third distance $\underline{d}$ lying in the range 0.5% to 2% of a chord ($\underline{c}$) of the resulting airfoil, the chord ($\underline{c}$) being equal to the distance between the resulting leading edge and the resulting trailing edge of the resulting airfoil.

6. The method according to claim 1, wherein for the at least one resulting half-airfoil of each resulting airfoil of the resulting blade, the new intermediate segment does not have any point of inflection.

7. The method according to claim 1, wherein for the at least one resulting half-airfoil of each resulting airfoil, of the resulting blade, the new intermediate segment is formed by a polynomial of degree 3.

8. The method according to claim 1, wherein a thickness ($\underline{e}$) equal to the maximum distance between the resulting suction side half-airfoil and the resulting pressure side half-airfoil of the resulting airfoil being unchanged for each airfoil.

9. An improved blade for an aircraft, the blade extending in a longitudinal direction (X) spanwise from a first end to a second end, and along a transverse direction (Y) from a leading edge to a trailing edge, the blade comprising successive cross-sections, each cross-section being defined by an airfoil, each airfoil being defined by two half-airfoils including a suction side half-airfoil and a pressure side half-airfoil, each of the two half-airfoils comprising respectively a leading edge segment, an intermediate segment, and a terminal segment, the leading edge segment being formed by a portion of an initial leading edge circle for each half-airfoil, the blade being made using the airfoils modified by the method according to claim 1.

10. The blade according to claim 9, the blade including at least one modified airfoil having the following points constituting it in a (u, v) reference frame, where the (u,v) reference frame is positioned at the leading edge of the airfoil:

| u | v | u | v |
|---|---|---|---|
| 1 | −0.001786945 | 0.898362357 | −0.010840856 |
| 0.993196671 | −0.001985598 | 0.891597532 | −0.011590451 |
| 0.986394068 | −0.002207676 | 0.884831428 | −0.012328409 |
| 0.979593055 | −0.002474188 | 0.878063944 | −0.013053601 |
| 0.972797017 | −0.002846444 | 0.871295153 | −0.013766489 |
| 0.966009283 | −0.00334798 | 0.864524839 | −0.01446477 |
| 0.959231538 | −0.003969973 | 0.857752694 | −0.015145064 |
| 0.952462167 | −0.004677375 | 0.850978899 | −0.015808721 |
| 0.945698087 | −0.00543364 | 0.844203571 | −0.016456549 |
| 0.938936411 | −0.006211139 | 0.837426402 | −0.017084812 |
| 0.932175284 | −0.00699338 | 0.830647466 | −0.01769373 |
| 0.925413868 | −0.007773122 | 0.823866985 | −0.018285182 |
| 0.918651913 | −0.008548178 | 0.817084869 | −0.018857594 |
| 0.911889371 | −0.009318091 | 0.810301096 | −0.019410013 |
| 0.905126235 | −0.010082772 | 0.80351579 | −0.01994328 |
| 0.796729019 | −0.020457552 | 0.517928853 | −0.031714422 |
| 0.789940809 | −0.020952474 | 0.511123609 | −0.031830168 |
| 0.783151154 | −0.02142717 | 0.504318209 | −0.031936351 |
| 0.77636003 | −0.02188035 | 0.497512653 | −0.032032039 |
| 0.769567587 | −0.022313335 | 0.490706967 | −0.032117987 |
| 0.762774083 | −0.022729319 | 0.483901202 | −0.032197353 |
| 0.755979673 | −0.023130246 | 0.477095319 | −0.032265929 |
| 0.749184378 | −0.023515873 | 0.470289308 | −0.032320316 |
| 0.742388212 | −0.023885831 | 0.463483226 | −0.032365091 |
| 0.735591337 | −0.024242526 | 0.456677121 | −0.032405942 |
| 0.728793868 | −0.024587732 | 0.449870986 | −0.032441642 |
| 0.721995724 | −0.024919355 | 0.443064806 | −0.032467215 |
| 0.715196908 | −0.025236924 | 0.436258596 | −0.032483086 |
| 0.708397634 | −0.025544526 | 0.429452371 | −0.032490197 |
| 0.701598053 | −0.025845254 | 0.422646143 | −0.032489133 |
| 0.694798192 | −0.026139602 | 0.415839919 | −0.032481255 |
| 0.687998051 | −0.026427388 | 0.40903371 | −0.032465258 |
| 0.681197702 | −0.026710228 | 0.402227525 | −0.032440931 |
| 0.674397224 | −0.026989947 | 0.395421376 | −0.03240799 |
| 0.667596548 | −0.027264813 | 0.388615266 | −0.032367826 |
| 0.660795631 | −0.027533653 | 0.381809217 | −0.032318475 |
| 0.6539945 | −0.027797017 | 0.375003228 | −0.032261403 |
| 0.647193248 | −0.028057231 | 0.368197303 | −0.03219708 |
| 0.640391836 | −0.028313241 | 0.361391487 | −0.032122196 |
| 0.633590203 | −0.028563323 | 0.354585764 | −0.032039251 |
| 0.626788339 | −0.028807008 | 0.347780125 | −0.031949679 |
| 0.619986234 | −0.029043913 | 0.340974572 | −0.031853825 |
| 0.613183863 | −0.029273006 | 0.334169101 | −0.031752274 |
| 0.606381216 | −0.029493794 | 0.327363733 | −0.031644051 |

| u | v | u | v |
|---|---|---|---|
| 0.599578347 | −0.029707604 | 0.320558458 | −0.031530134 |
| 0.592775298 | −0.0299156 | 0.313753268 | −0.031411284 |
| 0.5859721 | −0.030118688 | 0.306948237 | −0.031283611 |
| 0.57916867 | −0.030313852 | 0.300143383 | −0.031146822 |
| 0.572364927 | −0.03049775 | 0.293338582 | −0.031007455 |
| 0.565560931 | −0.030672048 | 0.286533862 | −0.030864197 |
| 0.558756795 | −0.030840795 | 0.279729308 | −0.030713192 |
| 0.551952565 | −0.031005743 | 0.272924904 | −0.030555618 |
| 0.545148165 | −0.03116348 | 0.266120671 | −0.030390859 |
| 0.538343579 | −0.031313011 | 0.259316619 | −0.030218702 |
| 0.531538852 | −0.031455938 | 0.252512799 | −0.030037765 |
| 0.52473394 | −0.031589825 | 0.245709168 | −0.02984953 |
| 0.2389061 | −0.029642347 | 0.017055197 | 0.031398858 |
| 0.232103344 | −0.029424966 | 0.022773637 | 0.035020099 |
| 0.225300281 | −0.029217381 | 0.028782261 | 0.038377771 |
| 0.218497451 | −0.029002322 | 0.034714585 | 0.041357472 |
| 0.211694821 | −0.02878103 | 0.04104269 | 0.044243616 |
| 0.20489239 | −0.028553712 | 0.04764504 | 0.046986069 |
| 0.1980901 | −0.028322196 | 0.053520572 | 0.049225586 |
| 0.191288083 | −0.028082795 | 0.060005457 | 0.051499484 |
| 0.184486235 | −0.027838658 | 0.066470409 | 0.053574728 |
| 0.177684636 | −0.027587677 | 0.072860138 | 0.055447169 |
| 0.170883306 | −0.027329498 | 0.079566418 | 0.057226152 |
| 0.164082254 | −0.02706411 | 0.086252972 | 0.058809723 |
| 0.157281464 | −0.026792042 | 0.092523495 | 0.06011674 |
| 0.150480843 | −0.02651589 | 0.099464645 | 0.061348393 |
| 0.143680696 | −0.026228166 | 0.106329761 | 0.062316521 |
| 0.136880887 | −0.02593271 | 0.112842766 | 0.062960094 |
| 0.130081991 | −0.025616805 | 0.119695822 | 0.063375175 |
| 0.123283702 | −0.025288199 | 0.126821535 | 0.064347542 |
| 0.11648642 | −0.024939313 | 0.133449162 | 0.064858948 |
| 0.109690041 | −0.024573293 | 0.140359805 | 0.065210542 |
| 0.102894859 | −0.024185659 | 0.147078544 | 0.065470225 |
| 0.096101239 | −0.023771588 | 0.15394452 | 0.065690149 |
| 0.089309534 | −0.023327169 | 0.160832609 | 0.065885435 |
| 0.082520166 | −0.022848405 | 0.167666831 | 0.066068107 |
| 0.075734086 | −0.022325075 | 0.174390994 | 0.066248131 |
| 0.06895205 | −0.021751715 | 0.180963426 | 0.066434585 |
| 0.062175509 | −0.021116713 | 0.187892045 | 0.066654887 |
| 0.055405911 | −0.020411465 | 0.194484137 | 0.066902299 |
| 0.048569015 | −0.01959531 | 0.20136219 | 0.067219293 |
| 0.041857093 | −0.018331146 | 0.208161319 | 0.067531027 |
| 0.035361778 | −0.016646922 | 0.214961994 | 0.067807003 |
| 0.02889838 | −0.014519503 | 0.221763937 | 0.068049706 |
| 0.022565134 | −0.011936864 | 0.228566908 | 0.068261634 |
| 0.016517841 | −0.008896071 | 0.2353707 | 0.068445387 |
| 0.010767086 | −0.005266414 | 0.242175141 | 0.068603235 |
| 0.005564092 | −0.000900209 | 0.248980113 | 0.068736314 |
| 0.001378576 | 0.004660301 | 0.255785492 | 0.068846514 |
| 0.0000531 | 0.011063518 | 0.26259118 | 0.068935722 |
| 0.002359147 | 0.017428969 | 0.269397095 | 0.069005436 |
| 0.006540217 | 0.022760138 | 0.276203173 | 0.069056868 |
| 0.011584271 | 0.027357699 | 0.283009359 | 0.069091011 |
| 0.289815609 | 0.06910863 | 0.56853419 | 0.057485118 |
| 0.296621881 | 0.069110154 | 0.575311132 | 0.056853938 |
| 0.303428139 | 0.069096657 | 0.582086371 | 0.056204727 |
| 0.310234356 | 0.06906913 | 0.588859871 | 0.055537614 |
| 0.317040502 | 0.06902766 | 0.595631595 | 0.054852706 |
| 0.323846547 | 0.068972103 | 0.602401532 | 0.054150359 |
| 0.330652477 | 0.068903782 | 0.609169702 | 0.05343118 |
| 0.337458273 | 0.068823343 | 0.615936106 | 0.052695577 |
| 0.344263902 | 0.068729778 | 0.622700706 | 0.051943555 |
| 0.351069341 | 0.06862326 | 0.629463471 | 0.051175219 |
| 0.357874575 | 0.068504395 | 0.636224373 | 0.050390649 |
| 0.364679585 | 0.068373299 | 0.642983367 | 0.049589813 |
| 0.371484324 | 0.068228876 | 0.649740389 | 0.048772502 |
| 0.378288761 | 0.068070824 | 0.656495386 | 0.047938621 |
| 0.385092882 | 0.067899724 | 0.66324833 | 0.047088273 |
| 0.391896644 | 0.06771487 | 0.669999234 | 0.046221885 |
| 0.398699995 | 0.067515467 | 0.67674808 | 0.045339604 |
| 0.405502918 | 0.067301989 | 0.683494782 | 0.044441075 |
| 0.412305398 | 0.067074804 | 0.690239249 | 0.043525919 |
| 0.419107378 | 0.066833144 | 0.696981456 | 0.042594262 |
| 0.425908825 | 0.066576891 | 0.703721395 | 0.041646337 |
| 0.432709721 | 0.066306435 | 0.710459045 | 0.040682281 |
| 0.439510025 | 0.066021467 | 0.717194363 | 0.039702055 |
| 0.446309695 | 0.065721734 | 0.723927302 | 0.038705626 |
| 0.45310869 | 0.06540709 | 0.730657864 | 0.037693268 |
| 0.459906969 | 0.065077335 | 0.737386067 | 0.03666534 |
| 0.466704491 | 0.064732303 | 0.74411193 | 0.035622217 |
| 0.473501201 | 0.064371654 | 0.75083548 | 0.034564292 |
| 0.480297039 | 0.063994929 | 0.757556764 | 0.033492056 |
| 0.487091937 | 0.063601606 | 0.764275844 | 0.032406096 |
| 0.493885843 | 0.063191506 | 0.770992781 | 0.031306963 |
| 0.500678717 | 0.062764654 | 0.777707655 | 0.030195292 |
| 0.507470482 | 0.062320496 | 0.784420527 | 0.0290716 |
| 0.514261055 | 0.061858479 | 0.791131569 | 0.027937026 |
| 0.521050355 | 0.061378131 | 0.797841006 | 0.026792999 |
| 0.527838315 | 0.060879186 | 0.804549062 | 0.025640905 |
| 0.534624852 | 0.060361255 | 0.811255979 | 0.024482195 |
| 0.541409899 | 0.059824155 | 0.817961912 | 0.023317802 |
| 0.548193404 | 0.059267917 | 0.824666879 | 0.022147866 |
| 0.554975313 | 0.058692549 | 0.831370693 | 0.020971335 |
| 0.561755584 | 0.058098178 | 0.838072796 | 0.019785103 |
| 0.844773294 | 0.018589833 | 0.925346654 | 0.005263502 |
| 0.851472851 | 0.017389301 | 0.932096381 | 0.004388012 |
| 0.858171878 | 0.016185812 | 0.938852854 | 0.003566159 |
| 0.864871417 | 0.01498518 | 0.945617863 | 0.002817862 |
| 0.871573299 | 0.013797696 | 0.952393717 | 0.002175116 |
| 0.878278267 | 0.012627762 | 0.959181102 | 0.0016685 |
| 0.88498646 | 0.011476467 | 0.965978931 | 0.001329665 |
| 0.891698822 | 0.010349729 | 0.972783523 | 0.001178862 |
| 0.898416142 | 0.009252936 | 0.979589744 | 0.001204674 |
| 0.905139321 | 0.008192654 | 0.986394194 | 0.001361998 |
| 0.911868861 | 0.007173523 | 0.993197164 | 0.001574008 |
| 0.918604395 | 0.006194794 | 1 | 0.001786945. |

11. A rotor for an aircraft, the rotor including at least two blades according to claim 9.

12. A rotary wing aircraft including a fuselage, at least one main rotor, and at least two advancement propellers, at least one of the advancement propellers being a rotor according to claim 11.

13. A method of making a propeller blade based upon a predetermined blade, the predetermined blade and the propeller blade extending in a longitudinal direction (X) spanwise from a first end to a second end and in a transverse direction (Y) from a leading edge to a trailing edge, the predetermined blade and the propeller blade having successive cross-sections, each cross-section of the predetermined blade being defined by a predetermined airfoil, each cross-section of the propeller blade being defined by a propeller airfoil, each predetermined airfoil being defined by two predetermined half-airfoils including a suction side predetermined half-airfoil and a pressure side predetermined half-airfoil, each propeller airfoil being defined by two propeller half-airfoils including a suction side propeller half-airfoil and a pressure side propeller half-airfoil, the two predetermined half-airfoils each comprising a predetermined leading edge segment, a predetermined intermediate segment, and a predetermined terminal segment, the two propeller half-airfoils each comprising a propeller leading edge segment, a propeller intermediate segment, and a propeller terminal segment, the predetermined leading edge segment of each predetermined half-airfoil being formed by a portion of an initial leading edge circle of the predetermined blade, the predetermined blade having a predetermined radius, wherein the method comprises:
    a first step of modifying at least one predetermined half-airfoil of each predetermined airfoil to obtain at least one propeller half-airfoil of the propeller airfoil;
    a second step of moving the leading edge of each propeller airfoil of the propeller blade relative to the predetermined leading edge for each predetermined airfoil of the predetermined blade; and a third step of fabricating the propeller blade with the propeller airfoils;

the first step having the following substeps:

increasing, for the at least one propeller half-airfoil, the predetermined radius of the initial leading edge circle to form a propeller blade leading edge circle of the at least one propeller half-airfoil having a portion that constitutes the propeller leading edge segment of the at least one propeller half-airfoil, the propeller leading edge circle having an propeller radius bigger than the predetermined radius, the propeller leading edge circle being tangential to the predetermined leading edge circle of the at least predetermined one half-airfoil at the propeller blade leading edge; and defining the propeller intermediate segment for the at least one propeller half-airfoil by replacing the predetermined intermediate segment of the at least one predetermined half-airfoil and connecting the propeller edge circle of the at least one propeller half-airfoil to the propeller terminal segment of the at least one propeller half-airfoil in order to provide an increased negative stall angle of attack of the propeller blade relative to the predetermined blade; and the second step having the following substeps:

moving the propeller leading edge of each propeller airfoil of the propeller blade, relative to the predetermined leading edge of the predetermined airfoil, through a third distance $\underline{d}$ perpendicularly to a straight line segment connecting the predetermined leading edge to the predetermined trailing edge, from the pressure side propeller half-airfoil towards the suction side propeller half-airfoil, with the propeller leading edge segments of both of the half-airfoils of the airfoil also being moved; and defining the propeller intermediate segment for each of the two propeller half-airfoils by respectively connecting the propeller leading edge segment respectively of both of the propeller half-airfoils to the propeller terminal segments of both of the propeller half-airfoils.

14. The method according to claim 13, wherein during the first step, both of the two predetermined half-airfoils of each predetermined airfoil are modified.

15. The method according to claim 13, wherein for each propeller airfoil of the propeller blade, the propeller radius of the propeller blade leading edge circle of the suction side propeller half-airfoil lies in the range 110% to 140% of the predetermined radius of the initial leading edge circle of the suction side predetermined half-airfoil, and the propeller radius of the propeller blade leading edge circle of the pressure side propeller half-airfoil lies in the range 115% to 220% of the predetermined radius of the initial leading edge circle of the pressure side propeller half-airfoil.

16. The method according to claim 13, wherein for the at least one propeller half-airfoil of each propeller airfoil of the propeller blade, the propeller intermediate segment begins on the propeller leading edge segment at a first distance from the propeller leading edge, which first distance is a minimum transverse distance lying in the range 0.5% to 5% of a chord ($\underline{c}$) of the propeller airfoil and connects with the propeller terminal segment at a second distance from the propeller leading edge, which second distance is a transverse distance equal to at most 25% of the chord ($\underline{c}$), the chord ($\underline{c}$) being equal to the distance between the propeller leading edge and the propeller trailing edge of the propeller airfoil.

17. The method according to claim 13, the third distance $\underline{d}$ lying in the range 0.5% to 2% of a chord ($\underline{c}$) of the propeller airfoil, the chord ($\underline{c}$) being equal to the distance between the propeller leading edge and the propeller trailing edge of the propeller airfoil.

18. The method according to claim 13, wherein for the at least one propeller half-airfoil of each propeller airfoil of the propeller blade, the propeller intermediate segment does not have any point of inflection.

19. The method according to claim 13, wherein for the at least one propeller half-airfoil of each propeller airfoil, of the propeller blade, the propeller intermediate segment is formed by a polynomial of degree 3.

20. A method of producing a propeller blade from an initial blade, the initial blade extending in a longitudinal direction (X) spanwise from an initial blade first end to an initial blade second end and in a transverse direction (Y) from an initial blade leading edge to an initial blade trailing edge, the initial blade having successive initial blade cross-sections, each initial blade cross-section defined by an initial blade airfoil, each initial blade airfoil defined by two initial blade half-airfoils including an initial blade suction side half-airfoil and an initial blade pressure side half-airfoil, the two initial blade half-airfoils each comprising an initial blade leading edge segment, an initial blade intermediate segment, and an initial blade terminal segment, the initial blade leading edge segment of each initial blade half-airfoil formed by a portion of an initial blade leading edge circle, the initial blade having an initial radius, the propeller blade extending in the longitudinal direction (X) spanwise from a propeller blade first end to a propeller blade second end and in the transverse direction (Y) from a propeller blade leading edge to a propeller blade trailing edge, the propeller blade having successive propeller blade cross-sections, each propeller blade cross-section defined by a propeller blade airfoil, each propeller blade airfoil defined by two propeller blade half-airfoils including a propeller blade suction side half-airfoil and a propeller blade pressure side half-airfoil, the two propeller blade half-airfoils each comprising a propeller blade leading edge segment, a propeller blade intermediate segment, and a propeller blade terminal segment, the propeller blade leading edge segment of each propeller blade half-airfoil being formed by a portion of a propeller blade leading edge circle, the propeller blade having a propeller blade radius, wherein the method comprises:

a first step of modifying at least one initial blade half-airfoil of each initial blade airfoil;

a second step of moving the leading edge for each propeller blade airfoil of the propeller blade; and a third step of fabricating the propeller blade with the propeller blade airfoils;

the first step having the following substeps:

increasing the initial radius of the initial blade leading edge circle of the at least one initial blade half-airfoil to form the propeller blade leading edge circle of the at least one propeller blade half-airfoil having a portion that constitutes the propeller blade leading edge segment of the at least one propeller blade half-airfoil, the propeller blade leading edge circle being tangential to the initial blade leading edge circle of the at least one initial blade half-airfoil at the propeller blade leading edge; and defining the propeller blade intermediate segment of the at least one propeller blade half-airfoil by connecting the propeller blade leading edge circle of the at least one propeller blade half-airfoil to the propeller blade terminal segment of the at least one propeller blade half-airfoil thereby providing the propeller blade with an increased negative stall angle of attack relative to the initial blade; and the second step having the following substeps:

moving the leading edge of each propeller blade airfoil of the propeller blade, relative to the initial blade leading edge of each respective initial blade airfoil, through a third distance $\underline{d}$ perpendicularly to a straight line segment connecting the initial blade leading edge to the initial blade trailing edge, from the propeller blade pressure side half-airfoil towards the propeller blade suction side half-airfoil, the propeller blade leading edge segment of the propeller blade airfoil also being moved; and defining the propeller blade intermediate segment for each of the two propeller blade half-airfoils by connecting the propeller blade leading edge segment of both of the propeller blade half-airfoils to the propeller blade terminal segments of both of the propeller blade half-airfoils.

\* \* \* \* \*